United States Patent
Grass et al.

(10) Patent No.: US 8,604,142 B2
(45) Date of Patent: Dec. 10, 2013

(54) POLYOLEFIN GAS PHASE POLYMERIZATION WITH 3-SUBSTITUTED C4-10-ALKENE

(75) Inventors: Michael Grass, Haltern am See (DE); Ted Pettijohn, Magnolia, TX (US); Stefan Buchholz, Hanau (DE); Gerhard Ellermann, Marl (DE); Pal Bentzrod, Stavern (NO); Tore Dreng, Larvik (NO); Jarmo Lindroos, Ulefoss (NO)

(73) Assignee: Evonik Oxeno GmbH, Marl (DE)

( * ) Notice: Subject to any disclaimer, the term of this patent is extended or adjusted under 35 U.S.C. 154(b) by 0 days.

(21) Appl. No.: 13/145,013

(22) PCT Filed: Jan. 12, 2010

(86) PCT No.: PCT/EP2010/050264
§ 371 (c)(1), (2), (4) Date: Oct. 13, 2011

(87) PCT Pub. No.: WO2010/084054
PCT Pub. Date: Jul. 29, 2010

(65) Prior Publication Data
US 2012/0022223 A1  Jan. 26, 2012

Related U.S. Application Data

(60) Provisional application No. 61/146,915, filed on Jan. 23, 2009.

(51) Int. Cl.
*C08F 4/24* (2006.01)

(52) U.S. Cl.
USPC .......................................................... 526/106

(58) Field of Classification Search
USPC .......................................................... 526/348
See application file for complete search history.

(56) References Cited

U.S. PATENT DOCUMENTS

| | | | |
|---|---|---|---|
| 5,352,749 A * | 10/1994 | DeChellis et al. | 526/68 |
| 5,534,473 A | 7/1996 | Welch et al. | |
| 5,594,078 A | 1/1997 | Welch et al. | |
| 2003/0166460 A1 | 9/2003 | Jens et al. | |
| 2003/0176603 A1 | 9/2003 | Ommundsen et al. | |
| 2009/0203858 A1 | 8/2009 | Grass et al. | |

FOREIGN PATENT DOCUMENTS

| | | |
|---|---|---|
| DE | 10 2006 03196 | 1/2008 |
| EP | 0 666 267 | 8/1995 |

(Continued)

OTHER PUBLICATIONS

Mohring et al., "Homogenous Group 4 metallocene Ziegler-Natta catalysts: the influence of cyclopentadienyl-ring substituents," J. Org. Chem., 479 (1994) 1-29.*

(Continued)

*Primary Examiner* — Ling Choi
*Assistant Examiner* — Catherine S Branch
(74) *Attorney, Agent, or Firm* — Oblon, Spivak, McClelland, Maier & Neustadt, L.L.P.

(57) ABSTRACT

An alkene interpolymer is prepared by polymerizing at least one 3-substituted $C_{4-10}$ alkene and at least one $C_{2-8}$ alkene in a gas phase polymerization using a polymerization catalyst system.

14 Claims, 3 Drawing Sheets

(56) References Cited

FOREIGN PATENT DOCUMENTS

| | | |
|---|---|---|
| WO | 01 77224 | 10/2001 |
| WO | 02 18046 | 3/2002 |
| WO | 2008 006636 | 1/2008 |
| WO | 2010 084047 | 7/2010 |
| WO | 2010 084049 | 7/2010 |
| WO | 2010 084051 | 7/2010 |
| WO | 2010 084054 | 7/2010 |
| WO | 2010 136289 | 12/2010 |
| WO | 2010 136290 | 12/2010 |
| WO | 2010 136295 | 12/2010 |
| WO | 2010 136297 | 12/2010 |

OTHER PUBLICATIONS

U.S. Appl. No. 13/322,527, filed Nov. 25, 2011, Kaizik, et al.
U.S. Appl. No. 13/375,091, filed Nov. 29, 2011, Winterberg, et al.
International Search Report issued Apr. 20, 2010 in PCT/EP10/050264 filed Jan. 12, 2010.
U.S. Appl. No. 61/146,938, filed Jan. 23, 2009, Grass, et al.
U.S. Appl. No. 13/145,263, filed Jul. 19, 2011, Grass, et al.
U.S. Appl. No. 61/146,943, filed Jan. 23, 2009, Grass, et al.
U.S. Appl. No. 13/145,199, filed Jul. 19, 2011, Grass, et al.
U.S. Appl. No. 61/146,948, filed Jan. 23, 2009, Grass, et al.
U.S. Appl. No. 13/145,043, filed Jul. 18, 2011, Pettijohn et al.
U.S. Appl. No. 61/146,915, filed Jan. 23, 2009, Grass et al.

\* cited by examiner

POLYOLEFIN GAS PHASE POLYMERIZATION WITH 3-SUBSTITUTED C4-10-ALKENE

BACKGROUND OF THE INVENTION

1. Field of the Invention

The present invention relates to a novel, efficient, process for the preparation of an alkene interpolymer comprising polymerizing at least one 3-substituted $C_{4-10}$ alkene and another $C_{2-8}$ alkene in a gas phase polymerization using a polymerization catalyst system. The invention also relates to interpolymers obtainable from the process.

2. Description of the Related Art

Alkenes, such as ethylene, are often copolymerized with comonomers in order to obtain polymers having particular properties. Thus it is common to copolymerize ethylene with comonomers such as 1-hexene or 1-octene in order to obtain a polymer having, for example, decreased density relative to ethylene homopolymer. Decreasing the density of the interpolymer generally impacts positively on a number of its mechanical properties, potentially making the polymer more useful in a number of end applications. Thus comonomers are generally used to tailor the properties of a polymer to suit its target application. There are vast numbers of commercially available ethylene interpolymers, e.g. comprising 1-butene, 1-hexene or 1-octene as comonomers.

A significant proportion of alkene polymer, e.g. polyethylene, is produced industrially using gas phase polymerization. Gas phase polymerization has several advantages over slurry polymerization. First there is no need for a slurry diluent, which in slurry polymerization is a component that is present in a large amount in the production plant, but which must be separated from the polymer at the end of the polymerization process and recovered and purified for reuse. Second the drying of the polymer after a gas phase polymerization compared to a slurry phase polymerization is much simpler. Third polymer powders that are too sticky to handle in slurry polymerization may behave well in gas phase polymerization, e.g. polymers having a density of 920 kg/m$^3$ may be too sticky and soluble to be produced in slurry polymerization, while corresponding polymers having a density of 910 kg/m$^3$ may be easily produced in gas phase polymerization. Fourth, in the case of a multistage process wherein much less comonomer were to be required in the second step, in the case of a gas phase reactor, there would be no need to remove comonomer from the polymer flow between reactors.

Gas phase polymerization may be carried out using any conventional polymerization catalyst system, e.g. a Ziegler Natta, single site or chromium oxide (Phillips-type) containing catalyst system. The catalyst system chosen is largely dictated by what properties are desired in the final interpolymer. For example, if an interpolymer with good processing properties is desired, the skilled man is likely to choose a Ziegler Natta catalyst or a chromium oxide catalyst. On the other hand, if the key desired property of the interpolymer is that it be homogenous, the skilled man would probably choose a catalyst system comprising a single site catalyst.

Regardless of the nature of the polymerization catalyst system used, when gas phase polymerization is carried out industrially it is usually conducted as a continuous process because this is economically most attractive. Thus the polymerization catalyst system is continuously introduced into the gas phase reactor along with the appropriate monomers, whilst the desired polymer is continuously removed. The continuous addition of fresh catalyst system is necessary because when the desired polyalkene is removed from the reactor system, a certain amount of catalyst system is also removed. It is thus important to provide additional catalyst system in order to maintain the polymerization reaction.

A disadvantage of this manufacturing set up, however, is that the catalyst system that is removed from the reactor with the desired polymer cannot usually be separated therefrom. Rather the catalyst system will typically be present within the polymer in the form of a partially modified residue. In other words, the catalyst system is present in the polyalkene as an impurity.

The presence of catalyst system residues in polymers such as polyethylene is undesirable for a number of reasons, e.g.

they make processing, e.g. to fibers or films difficult if the residues make particles of the same size or greater than the fiber or film thickness they reduce the performance of the polymer in its end use, e.g. it can reduce the optical performance of films made using the polymer by making visually observable inhomogeneities in the film, often called gels, specs or fish eyes they can render polymers unsuitable for use in applications where the level of impurities present therein is required to be below a certain standard, e.g. in food and/or medical applications they, through their content of transition metals, can act as accelerators for polymer degradation resulting eventually in discoloration and loss of mechanical strength.

It is thus generally desirable to try to minimize the amount of catalyst system needed to make a given amount of polymer. This helps overcome the above-mentioned problems in processing and use and also decreases the production cost of the polymer through reduced catalyst system cost per ton polymer. It also minimizes any safety risks associated with the handling of catalytic materials. Additionally the ability to use a lesser amount of catalyst system per kg of final polymer in some cases enables production plants to increase their production rate without having to increase their reactor size.

There are a number of known methods that usually would increase catalyst system productivity (i.e. ton polymer/kg catalyst system) for a given catalyst system. These include increasing the residence time in the reactor, increasing the polymerization temperature, increasing the partial pressure of monomer and/or the partial pressure of comonomer. All of these approaches, however, suffer from serious drawbacks.

Increasing the residence time can only be done by decreasing production rate, which is economically unfavorable, or by increasing polymer concentration in the reactor which may easily lead to fouling and/or lumps in the reactor and ultimately to a long stop for cleaning. Increasing the partial pressure of monomer has a negative effect on production economy by reducing the relative conversion of monomer. Increasing the partial pressure of comonomer increases the incorporation of comonomer and thus, in effect, leads to the production of a different interpolymer to the one targeted. Increasing the polymerization temperature from the usual operation temperature is probably the most common strategy employed to date, but as with increasing the residence time it can lead to reactor sheeting or lumping or chunking in the reactor and again to a long stop for cleaning the reactor system.

DETAILED DESCRIPTION OF THE INVENTION

Figure 1:
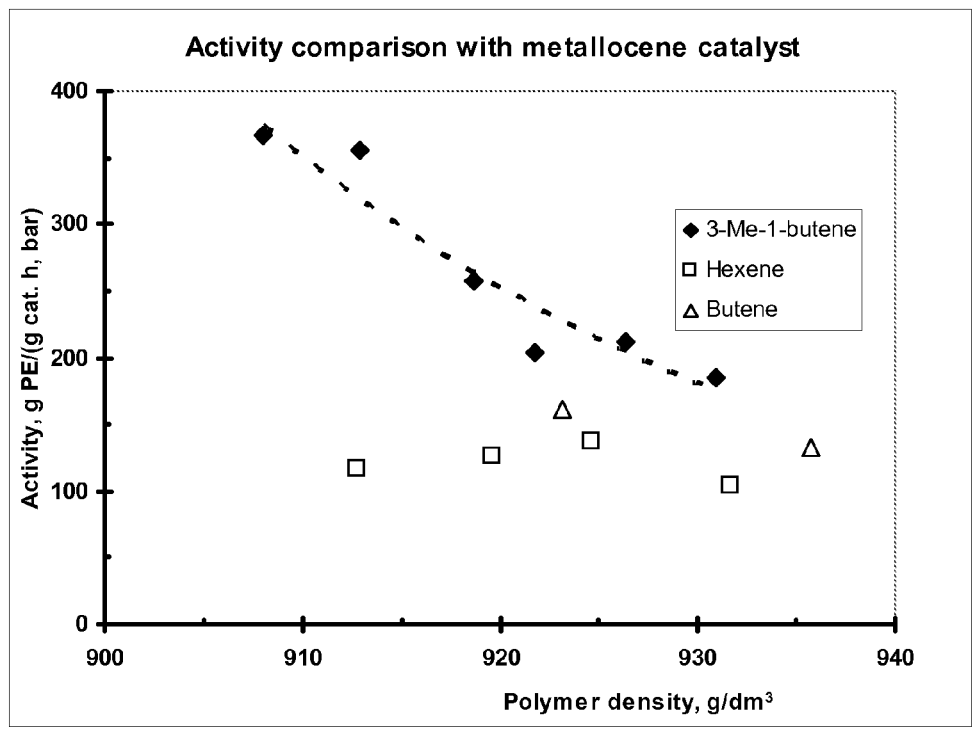
FIG. 1 is a plot of catalyst system activity coefficient versus polyethylene density for a polymerization carried out with a single site catalyst.

In view of the drawbacks of the background art, there is a need for alternative polymerization processes for the preparation of alkene polymers and, in particular, alkene interpolymers that enable the amount of catalyst system needed to make a given amount of polymer to be minimized. Processes that enable the reaction to be carried out under conventional gas phase polymerization conditions (i.e. typical temperature and pressure conditions) as well as in existing gas phase reactors are especially desired.

It has now been surprisingly found that the productivity (i.e. ton polymer/kg catalyst system) of polymerization catalyst system in the gas phase polymerization of 1-alkenes such as ethylene is significantly increased by using a 3-substituted $C_{4-10}$ alkene as comonomer rather than a conventional non-substituted, linear $C_{4-10}$ alkene. As a result, a significantly lower amount of catalyst system can be used to manufacture a given amount of an interpolymer comprising the 3-substituted $C_{4-10}$ alkene (i.e. catalyst system productivity is significantly increased). Advantageously the major properties of a 1-alkene/3-substituted $C_{4-10}$ alkene interpolymer (e.g. $MFR_2$, density, melting point, Mw, Mn and molecular weight distribution) may be maintained on a comparable level to the properties of the conventional 1-alkene/non-substituted, linear $C_{4-10}$ alkene interpolymer. Thus the process herein described offers an economically attractive approach for making interpolymers that can be used as substitutes for the ethylene/1-hexene and ethylene/1-octene copolymers commercially available.

Copolymers comprising ethylene and 3-methyl-but-1-ene have previously been described in the prior art, e.g. in WO2008/006636, EP-A-0058549 and WO2008/003020. None of these documents, however, specifically disclose a gas phase copolymerisation of 3-methyl-but-1-ene with another $C_{2-8}$ alkene. Rather WO2008/006636 is focused on the slurry polymerization of ethylene and 3-methyl-but-1-ene and, in particular, on slurry polymerization using a non-supported catalyst system. Slurry polymerization with a non-supported catalyst system is preferred because the catalyst system has a higher activity in slurry conditions and the need for a support can be avoided.

EP-A-0058549 describes a Ziegler Natta catalyst for the polymerization of ethylene including its copolymerisation with other olefins. A list of comonomers is mentioned in the description of EP-A-0058549 but there is no disclosure therein of a 3-substituted $C_{4-10}$ alkene such as 3-methyl-1-butene. Nevertheless one of the examples in the experimental section (example 51) of EP-A-0058549 illustrates the slurry phase copolymerisation of ethylene and 3-methyl-1-butene. The results in Table 5, however, show that the Ziegler Natta catalytic activity is less when 3-methyl-1-butene is used as comonomer relative to the use of 1-hexene or 1-octene as comonomer.

WO 2008/003020 is focused on the production of films having specific properties such as dart drop impact strength and moisture vapor transmission rate. Few details are given in the examples of WO 2008/003020 as to how the polymers processed into films are prepared. Certainly there is no mention in the examples of WO 2008/003020 of the manufacture of the polymers by gas phase polymerization.

Accordingly, none of the above-mentioned documents teach or disclose that the catalytic productivity of a polymerization catalyst system in a gas phase copolymerisation of a $C_{2-8}$ alkene such as ethylene may be significantly increased by utilizing 3-methyl-but-1-ene as comonomer, rather than conventional comonomers such as 1-butene, 1-hexene or 1-octene.

In a first aspect, the present invention provides a process for the preparation of an alkene interpolymer comprising polymerizing at least one 3-substituted $C_{4-10}$ alkene and at least one $C_{2-8}$ alkene in a gas phase polymerization using a polymerization catalyst system.

In a preferred embodiment of the process of the present invention the polymerization catalyst system is in particulate form. Particularly preferably the catalyst system comprises a carrier.

In a further preferred embodiment of the process of the present invention the polymerization catalyst system comprises a single site catalyst or a Ziegler Natta catalyst, especially a single site catalyst.

In a further aspect, the present invention provides an alkene interpolymer obtainable by a process as hereinbefore described.

In a further preferred embodiment, the present invention provides a process of increasing the productivity of a gas phase polymerization comprising polymerizing at least one 3-substituted $C_{4-10}$ alkene with another $C_{2-8}$ alkene.

In another aspect, the present invention provides the use of a 3-substituted $C_{4-10}$ alkene in the preparation of a $C_{2-8}$ alkene interpolymer by gas phase polymerization.

In a further preferred embodiment, the present invention provides a process of gas phase polymerization comprising polymerizing a 3-substituted $C_{4-10}$ alkene and optionally another $C_{2-8}$ alkene using a polymerization catalyst system, wherein said polymerization is carried out in a concentration of $C_{3-8}$ saturated hydrocarbon (e.g. $C_{3-8}$ alkane) of lower than 10 mol %.

In a preferred embodiment, the polymerization is carried out in condensed mode or supercondensed mode.

In a further preferred embodiment, the present invention provides a process of 3-substituted $C_{4-10}$ alkene in a gas phase polymerization, wherein said alkene constitutes more than 5 wt % of a liquid (e.g. a vaporizable liquid) that is continuously fed to the gas phase polymerization reactor.

DEFINITIONS

As used herein, the term "alkene interpolymer" refers to polymers comprising repeat units deriving from at least one 3-substituted $C_{4-10}$ alkene monomer and at least one other $C_{2-8}$ alkene. Preferred interpolymers are binary (i.e. preferred interpolymers are copolymers) and comprise repeat units deriving from one type of 3-substituted $C_{4-10}$ alkene comonomer and one other type of $C_{2-8}$ alkene monomer. Other preferred interpolymers are ternary, e.g. they comprise repeat units deriving from one type of 3-substituted $C_{4-10}$ alkene comonomer and two types of $C_{2-8}$ alkene monomer. Particularly preferred interpolymers are copolymers. In preferred interpolymers at least 0.01% wt, still more preferably at least 0.1% wt, e.g. at least 0.5% wt of each monomer is present based on the total weight of the interpolymer.

In contrast the term "alkene homopolymer" as used herein, refers to polymers which consist essentially of repeat units deriving from one type of $C_{2-8}$ alkene, e.g. ethylene. Homopolymers may, for example, comprise at least 99.9% wt e.g. at least 99.99% wt of repeat units deriving from one type of $C_{2-8}$ alkene based on the total weight of the polymer.

As used herein, the term "3-substituted $C_{4-10}$ alkene" refers to an alkene having: (i) a backbone containing 4 to 10 carbon atoms, wherein the backbone is the longest carbon chain in the molecule that contains an alkene double bond, and (ii) a substituent (i.e. a group other than H) at the 3 position.

Gas phase polymerization is a term of the art and is readily understood by the skilled man. As used herein, the terms "condensed mode" and "supercondensed mode" refer to gas phase polymerization wherein a vaporizable liquid is continuously fed to the reactor.

As used herein, the term "catalyst system" refers to the total active entity that catalyses the polymerization reaction. Typically the catalyst system is a coordination catalyst system comprising a transition metal compound (the active site precursor) and an activator (sometimes referred to as a cocatalyst) that is able to activate the transition metal compound. The catalyst system of the present invention preferably comprises an activator, at least one transition metal active site precursor and a particle building material that may be the activator or another material. Preferably, the particle building material is a carrier.

As used herein, the term "multisite catalyst system" refers to a catalyst system comprising at least two different active sites deriving from at least two chemically different active site precursors. Examples of a multisite catalyst system are one comprising two or three different metallocene active sites precursors, one comprising two or three different Ziegler Natta active site precursors or one comprising a Ziegler Natta active site and a metallocene active site. If there are only two active sites in the catalyst system, it can be called a dual site catalyst system. Particulate multisite catalyst systems may contain its different active sites in a single type of catalyst particle. Alternatively, each type of active site may each be contained in separate particles. If all the active sites of one type are contained in separate particles of one type, each type of particles may enter the reactor through its own inlet.

As used herein, the term "single site catalyst" refers to a catalyst having one type of active catalytic site. An example of a single site catalyst is a metallocene-containing catalyst. A typical Ziegler Natta (ZN) catalyst made from, e.g. impregnation of $TiCl_4$ into a carrier material, or chromium oxide (Philips) catalyst made from, e.g. impregnation of chromium oxide into silica, are not single site catalysts as they contain a mixture of different types of sites that give rise to polymer chains of different composition.

As used herein, the term "Ziegler Natta (ZN)" catalyst refers to a catalyst that preferably comprises a transition metal component (e.g. Ti) which is sigma bonded to its ligands and an activator (e.g. an Al containing organometallic compound). Preferred Ziegler Natta catalysts additionally comprise a particle building material.

As used herein, the term "polymerization section" refers to all of the polymerization reactors present in a multistage polymerization. The term also encompasses any prepolymerization reactors that are used.

As used herein, the term "multimodal" refers to a polymer comprising at least two components, which have been produced under different polymerization conditions and/or by a multisite catalyst system in one stage and/or by using two or more different catalyst systems in a polymerization stage resulting in different (weight average) molecular weights and molecular weight distributions for the components. The prefix "multi" refers to the number of different components present in the polymer. Thus, for example, a polymer consisting of two components only is called "bimodal". The form of the molecular weight distribution curve, i.e. the appearance of the graph of the polymer weight fraction as a function of its molecular weight, of a multimodal polyalkene will show two or more maxima or at least be distinctly broadened in comparison with the curves for the individual components. In addition, multimodality may show as a difference in melting or crystallisation temperature of components.

In contrast a polymer comprising one component produced under constant polymerization conditions is referred to herein as unimodal.

$C_{2-8}$ Alkene

In order to produce an interpolymer the $C_{2-8}$ alkene should be a different alkene to the alkene used as the 3-substituted $C_{4-10}$ alkene. One or more (e.g. two or three) $C_{2-8}$ alkenes may be used. Preferably, however, one or two, e.g. one, $C_{2-8}$ alkene is used.

Preferably, the $C_{2-8}$ alkene is a monoalkene. Still more preferably the $C_{2-8}$ alkene is a terminal alkene. In other words, the $C_{2-8}$ alkene is preferably unsaturated at carbon numbers 1 and 2. Preferred $C_{2-8}$ alkene are thus $C_{2-8}$ alk-1-enes.

The $C_{2-8}$ alkene is preferably a linear alkene. Still more preferably the $C_{2-8}$ alkene is an unsubstituted $C_{2-8}$ alkene.

Representative examples of $C_{2-8}$ alkenes that are suitable for use in the process of the present invention include ethylene, propylene, 1-butene, 1-pentene, 4-methyl-1-pentene, 1-hexene and 1-octene. Preferably, the $C_{2-8}$ alkene is selected from ethylene, propylene, 1-butene, 4-methyl-1-pentene or mixtures therefore. Particularly preferably the $C_{2-8}$ alkene is ethylene or propylene, e.g. ethylene.

$C_{2-8}$ alkenes for use in the present invention are commercially available. Alternatively, ethylene, propylene and but-1-ene may be prepared by thermal cracking. Higher linear olefins are available from catalytic oligomerization of ethylene or by Fischer Tropsch synthesis.

3-Substituted $C_{4-10}$ Alkene

It has been found that the gas phase polymerization of the above-described $C_{2-8}$ alkene with 3-substituted $C_{4-10}$ alkene occurs with unexpectedly high efficiency (i.e. excellent catalytic productivity). It has also been found that to provide a polymer of any given density, less 3-substituted $C_{4-10}$ alkene needs to be included therein than 1-hexene or 1-octene. This is advantageous as the cost of comonomers such as 1-hexene, 1-octene or 3-substituted $C_{4-10}$ alkene is much greater than the cost of ethylene or propylene.

Preferably, the substituent present at carbon 3 of the 3-substituted $C_{4-10}$ alkene is a $C_{1-6}$ alkyl group. The alkyl group may be substituted by non-hydrocarbyl substituents or unsubstituted. Representative examples of non-hydrocarbyl substituents that may be present on the alkyl group include F and Cl. Preferably, however, the $C_{1-6}$ alkyl group is unsubstituted. Particularly preferably the substituent group present at carbon 3 is a $C_{1-3}$ alkyl group such as methyl, ethyl or iso-propyl. Methyl is an especially preferred substituent group.

Preferably, the 3-substituted $C_{4-10}$ alkene is solely substituted at carbon 3. If, however, a substituent is present at another position it is preferably a $C_{1-6}$ alkyl group as described above for the substituent present at carbon 3.

The 3-substituted $C_{4-10}$ alkene is preferably a monoalkene. Still more preferably the 3-substituted $C_{4-10}$ alkene is a terminal alkene. In other words, the 3-substituted $C_{4-10}$ alkene is preferably unsaturated at carbon numbers 1 and 2. Preferred 3-substituted $C_{4-10}$ alkenes are thus 3-substituted $C_{4-10}$ alk-1-enes.

Preferred 3-substituted $C_{4-10}$ alkenes for use in the process of the present invention are those of formula (I):

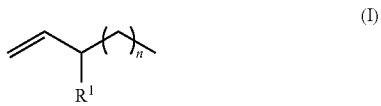

wherein $R^1$ is a substituted or unsubstituted, preferably unsubstituted, $C_{1-6}$ alkyl group and n is an integer between 0 and 6.

In preferred compounds of formula (I) $R^1$ is methyl or ethyl, e.g. methyl. In further preferred compounds of formula (I) n is 0, 1 or 2, still more preferably 0 or 1, e.g. 0.

Representative examples of compounds of formula (I) that can be used in the process of the present invention include 3-methyl-1-butene, 3-methyl-1-pentene, 3-methyl-1-hexene, 3-ethyl-1-pentene and 3-ethyl-1-hexene. A particularly preferred 3-substituted $C_{4-10}$ alkene for use in the process of the present invention is 3-methyl-1-butene.

3-substituted $C_{4-10}$ alkenes for use in the invention are commercially available, e.g. from Sigma-Aldrich. 3-methyl-1-butene can be made, e.g. according to WO 2008/006633.

Catalyst System

The polymerization catalyst system used in the gas phase polymerization is preferably in the form of a particulate. Preferably, the catalyst system is in the form of particles having a weight average particle size of 0.5 to 250 microns, preferably 4 to 150 microns. Particularly preferably the polymerization catalyst system comprises a carrier. Suitable carrier materials are known to the skilled man in the art but are discussed in more detail below.

The polymerization catalyst system used in the gas phase polymerization preferably comprises a Ziegler Natta catalyst, a single site catalyst or a chromium oxide catalyst, more preferably a single site catalyst. Preferred single site catalysts comprise a metallocene.

Single Site Catalyst System

The catalyst system comprising a single site catalyst that may be used in the process of the present invention is preferably a metallocene-containing catalyst system. Such catalyst systems are well known in the art, e.g. from WO98/02246, the contents of which are hereby incorporated herein by reference.

The catalyst system may be supported or unsupported, but is preferably supported. Supported catalyst systems may be prepared by impregnating the active site precursors into it. Alternatively, the catalyst system may be synthesized by producing the solid particles from liquid starting material components directly, without a separate impregnation step. Preferred catalyst systems comprising a single site catalyst comprise a carrier.

The catalyst system comprising a single site catalyst preferably comprises a carrier, an activator and at least one transition metal active site precursor (e.g. a metallocene). The activator may be aluminoxane, borane or borate but preferably is aluminoxane. Preferably, the active site precursor is a metallocene.

Catalyst Morphology and Carrier

The catalyst system comprising a single site catalyst used in the process of the present invention is preferably in particulate form. Preferably, the catalyst system is in the form of particles having a weight average particle size of 1 to 250 microns, preferably 4 to 150 microns. Preferably, the catalyst system is in the form of a free-flowing powder.

Suitable carrier materials for use in the catalyst system comprising a single site catalyst are well known in the art. The carrier material is preferably an inorganic material, e.g. an oxide of silicon and/or of aluminium or $MgCl_2$. Preferably, the carrier is an oxide of silicon and/or aluminium. Still more preferably the carrier is silica.

Preferably, the carrier particles have an average particle size of 1 to 500 microns, preferably 3 to 250 microns, e.g. 10 to 150 microns. Particles of appropriate size can be obtained by sieving to eliminate oversized particles. Sieving can be carried out before, during or after the preparation of the catalyst system. Preferably, the particles are spherical. The surface area of the carrier is preferably in the range 5 to 1200 $m^2/g$, more preferably 50 to 600 $m^2/g$. The pore volume of the carrier is preferably in the range 0.1 to 5 $cm^3/g$, preferably 0.5-3.5 $cm^3/g$.

Preferably, the carrier is dehydrated prior to use. Particularly preferably the carrier is heated at 100 to 800° C., more preferably 150 to 700° C., e.g. at about 250° C. prior to use. Preferably, dehydration is carried out for 0.5-12 hours.

Carriers that are suitable for the preparation of the catalyst systems herein described are commercially available, e.g. from Grace and PQ Corporation.

Activator

Aluminoxane is preferably present in the catalyst system as activator. The aluminoxane is preferably oligomeric. Still more preferably the aluminoxane is a cage-like (e.g. multicyclic) molecule, e.g. with an approximate formula $(Al_{1.4}R_{0.8}O)_n$ where n is 10-60 and R is an alkyl group, e.g. a $C_{1-20}$ alkyl group. In preferred aluminoxanes R is a $C_{1-8}$ alkyl group, e.g. methyl. Methylaluminoxane (MAO) is a mixture of oligomers with a distribution of molecular weights, preferably with an average molecular weight of 700 to 1500. MAO is a preferred aluminoxane for use in the catalyst system.

The aluminoxane may be modified with an aluminium alkyl or aluminium alkoxy compound. Especially preferred modifying compounds are aluminium alkyls, in particular, aluminium trialkyls such as trimethyl aluminium, triethyl aluminium and tri isobutyl aluminium. Trimethyl aluminium is particularly preferred.

Aluminoxanes, such as MAO, that are suitable for the preparation of the catalyst systems herein described are commercially available, e.g. from Albemarle and Chemtura.

It is also possible to generate the activator in situ, e.g. by slow hydrolysis of trimethylaluminium inside the pores of a carrier. This process is well known in the art.

Alternatively, activators based on boron may be used. Preferred boron based activators are those wherein the boron is attached to at least 3 fluorinated phenyl rings as described in EP 520 732.

Alternatively, an activating, solid surface as described in U.S. Pat. No. 7,312,283 may be used as a carrier. These are solid, particulate inorganic oxides of high porosity which exhibit Lewis acid or Brønsted acidic behavior and which have been treated with an electron-withdrawing component, typically an anion, and which have then been calcined.

Transition Metal Active Site Precursor

Generally the metal of the transition metal precursors are 16-electron complexes, although they may sometimes comprise fewer electrons, e.g. complexes of Ti, Zr or Hf.

The active site transition metal precursor is preferably a metallocene.

The metallocene preferably comprises a metal coordinated by one or more η-bonding ligands. The metal is preferably Zr, Hf or Ti, especially Zr or Hf. The η-bonding ligand is preferably a η$^5$-cyclic ligand, i.e. a homo or heterocyclic cyclopentadienyl group optionally with fused or pendant substituents.

The metallocene preferably has the formula:

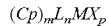

$(Cp)_mL_nMX_p$ wherein Cp is an unsubstituted or substituted cyclopentadienyl group, an unsubstituted or substituted indenyl or an unsubstituted or substituted fluorenyl (e.g. an unsubstituted or substituted cyclopentadienyl group);

the optional one or more substituent(s) being independently selected from halogen (e.g. Cl, F, Br, I), hydrocarbyl (e.g. $C_{1-20}$ alkyl, $C_{2-20}$ alkenyl, $C_{2-20}$ alkynyl, $C_{6-20}$ aryl or $C_{6-20}$ arylalkyl), $C_{3-12}$ cycloalkyl which contains 1, 2, 3 or 4 heteroatom(s) in the ring moiety, $C_{6-20}$ heteroaryl, $C_{1-20}$ haloalkyl, —SiR"$_3$, —OSiR"$_3$, —SR", —PR"$_2$ or —NR"$_2$, each R" is independently a H or hydrocarbyl, e.g. e.g. $C_{1-20}$ alkyl, $C_{2-20}$ alkenyl, $C_{2-20}$ alkynyl, $C_{6-20}$ aryl or $C_{6-20}$ arylalkyl; or in the case of —NR"$_2$, the two R" can form a ring, e.g. a 5 or 6 membered ring, together with the nitrogen atom to which they are attached;

L is a bridge of 1-7 atoms, e.g. a bridge of 1-4 C atoms and 0-4 heteroatoms, wherein the heteroatom(s) can be, e.g. Si, Ge and/or O atom(s), wherein each of the bridge atoms may independently bear substituents (e.g. $C_{1-20}$ alkyl, tri($C_{1-20}$ alkyl)silyl, tri($C_{1-20}$alkyl)siloxy or $C_{6-20}$ aryl substituents); or a bridge of 1-3, e.g. one or two, heteroatoms, such as Si, Ge and/or O atom(s), e.g. —SiR'''$_2$, wherein each R''' is independently $C_{1-20}$ alkyl, $C_{6-20}$ aryl or tri($C_{1-20}$alkyl)silyl residue such as trimethylsilyl;

M is a transition metal of Group 3 to 10, preferably of Group 4 to 6, such as Group 4, e.g. titanium, zirconium or hafnium, preferably hafnium, each X is independently a sigma ligand such as halogen (e.g. Cl, F, Br, I), hydrogen, $C_{1-20}$ alkyl, $C_{1-20}$ alkoxy, $C_{2-20}$ alkenyl, $C_{2-20}$ alkynyl, $C_{3-12}$ cycloalkyl, $C_{6-20}$ aryl, $C_{6-20}$ aryloxy, $C_{7-20}$ arylalkyl, $C_{7-20}$ arylalkenyl, —SR", —PR"$_3$, —SiR"$_3$, —OSiR"$_3$, —NR"$_2$, or CH$_2$—Y wherein Y is $C_{6-20}$ aryl, $C_{6-20}$ heteroaryl, $C_{1-20}$ alkoxy, $C_{6-20}$ aryloxy, —NR"$_2$, —SR", —PR"$_3$, —SiR"$_3$ or —OSiR$_{13}$; alternatively, two X ligands are bridged to provide a bidentate ligand on the metal, e.g. 1,3-pentadiene;

each of the above mentioned ring moieties alone or as part of another moiety as the substituent for Cp, X, R" or R''' can be further substituted, e.g. with $C_{1-20}$ alkyl which may contain Si and/or O atom(s);

m is 1, 2 or 3, preferably 1 or 2, more preferably 2;

n is 0, 1 or 2, preferably 0 or 1;

p is 1, 2 or 3 (e.g. 2 or 3); and the sum of m+p is equal to the valence of M (e.g. when M is Zr, Hf or Ti, the sum of m+p should be 4).

Preferably, Cp is a cyclopentadienyl group, especially a substituted cyclopentadienyl group. Preferred substituents on Cp groups, including cyclopentadienyl, are $C_{1-20}$ alkyl. Preferably, the cyclopentadienyl group is substituted with a straight chain $C_{1-6}$ alkyl group, e.g. n-butyl.

If present L is preferably a methylene, ethylene or silyl bridge whereby the silyl can be substituted as defined above, e.g. a (dimethyl)Si=, (methylphenyl)Si= or (trimethylsilylmethyl)Si=; n is 1; m is 2 and p is 2. When L is a silyl bridge, R" is preferably other than H. More preferably, however, n is 0.

X is preferably H, halogen, $C_{1-20}$ alkyl or $C_{6-20}$ aryl. When X are halogen atoms, they are preferably selected from fluorine, chlorine, bromine and iodine. Most preferably X is chlorine. When X is a $C_{1-20}$ alkyl group, it is preferably a straight chain or branched $C_{1-8}$ alkyl group, e.g. a methyl, ethyl, n-propyl, n-hexyl or n-octyl group. When X is an $C_{6-20}$ aryl group, it is preferably phenyl or benzyl. In preferred metallocenes X is a halogen, e.g. chlorine.

Suitable metallocene compounds include:

bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis(indenyl)metal dihalides wherein the metal is zirconium or hafnium, preferably hafnium, halide groups are preferably chlorine and alkyl groups are preferably $C_{1-6}$ alkyl.

Representative examples of metallocenes include:

bis(cyclopentadienyl)ZrCl$_2$, bis(cyclopentadienyl)HfCl$_2$, bis(cyclopentadienyl)ZrMe$_2$, bis(cyclopentadienyl)HfMe$_2$, bis(cyclopentadienyl)Zr(H)Cl, bis(cyclopentadienyl)Hf(H)Cl, bis(n-butylcyclopentadienyl)ZrCl$_2$, bis(n-butylcyclopentadienyl)HfCl$_2$, bis(n-butylcyclopentadienyl)ZrMe$_2$, bis(n-butylcyclopentadienyl)HfMe$_2$, bis(n-butylcyclopentadienyl)Zr(H)Cl, bis(n-butylcyclopentadienyl)Hf(H)Cl, bis(pentamethylcyclopentadienyl)ZrCl$_2$, bis(pentamethylcyclopentadienyl)HfCl$_2$, bis-(1,3-dimethylcyclopentadienyl)ZrCl$_2$, bis(4,5,6,7-tetrahydro-1-indenyl)ZrCl$_2$ and ethylene-[bis(4,5,6,7-tetrahydro-1-indenyl)ZrCl$_2$.

Alternatively, the metallocene may be a constrained geometry catalyst (CGC). These comprise a transition metal, M (preferably Ti) with one eta-cyclopentadienyl ligand and two X groups, i.e. be of the formula CpMX$_2$, wherein X is as defined above and the cyclopentadienyl has a —Si(R")$_2$N(R")-substituent wherein R" is as defined above and the N atom is bonded to M. Preferably, R" is $C_{1-20}$ alkyl. Preferably, the cyclopentadienyl ligand is substituted with 1 to 4, preferably 4, $C_{1-20}$ alkyl groups. Examples of metallocenes of this type are described in US 2003/0022998, the contents of which are hereby incorporated by reference.

The preparation of metallocenes can be carried out according to, or analogously to, the methods known from the literature and is within the skills of a polymer chemist.

Other types of single site precursor compounds are described in:

G. J. P. Britovsek et al.: The Search for New-Generation Olefin Polymerization Catalysts: Life beyond Metallocenes, Angew. Chemie Int. Ed., 38 (1999), p. 428.

H. Makio et al.: FI Catalysts: A New Family of High Performance Catalysts for Olefin Polymerization, Advanced Synthesis and Catalysis, 344 (2002), p. 477.

Dupont-Brookhart type active site precursors are disclosed in U.S. Pat. No. 5,880,241.

Catalyst System Preparation

To form the catalyst systems for use in the present invention, the carrier, e.g. silica, is preferably dehydrated (e.g. by heating). The further preparation of the catalyst system is preferably undertaken under anhydrous conditions and in the absence of oxygen and water. The dehydrated carrier is then preferably added to a liquid medium to form a slurry. The liquid medium is preferably a hydrocarbon comprising 5 to 20 carbon atoms, e.g. pentane, isopentane, hexane, isohexane, heptane, octane, nonane, decane, dodecane, cyclopentane, cyclohexane, cycloheptane, toluene and mixtures thereof. Isomers of any of the afore-mentioned hydrocarbons may also be used. The volume of the liquid medium is preferably sufficient to fill the pores of the carrier, and more preferably to form a slurry of the carrier particles. Typically the volume of the liquid medium will be 2 to 15 times the pore volume of the support as measured by nitrogen adsorption method (BET method). This helps to ensure that a uniform distribution of metals on the surface and pores of the carrier is achieved.

In a separate vessel, the metallocene may be mixed with aluminoxane in a solvent. The solvent may be a hydrocarbon comprising 5 to 20 carbon atoms, e.g. toluene, xylene, cyclopentane, cyclohexane, cycloheptane, pentane, isopentane, hexane, isohexane, heptane, octane or mixtures thereof. Preferably, toluene is used. Preferably, the metallocene is simply added to the toluene solution in which the aluminoxane is present in its commercially available form. The volume of the solvent is preferably about equal to or less than the pore volume of the carrier. The resulting mixture is then mixed with the carrier, preferably at a temperature in the range 0 to 60° C. Impregnation of the metallocene and aluminoxane into the carrier is preferably achieved using agitation. Agitation is preferably carried out for 15 minutes to 12 hours. Alternatively, the carrier may be impregnated with aluminoxane first, followed by metallocene. Simultaneous impregnation with aluminoxane and metallocene is, however, preferred.

The solvent and/or liquid medium are typically removed by filtering and/or decanting and/or evaporation, preferably by evaporation only. Optionally, the impregnated particles are washed with a hydrocarbon solvent to remove extractable metallocene and/or aluminoxane. Removal of the solvent and liquid medium from the pores of the carrier material is preferably achieved by heating and/or purging with an inert gas. Removal of the solvent and liquid medium is preferably carried out under vacuum. Preferably, the temperature of any heating step is below 80° C., e.g. heating may be carried out at 40-70° C. Typically heating may be carried out for 2 to 24 hours. Alternatively, the catalyst system particles may remain in a slurry form and used as such when fed to the polymerization reactor, however, this is not preferred.

The metallocene and aluminoxane loading on the carrier is such that the amount of aluminoxane (dry), on the carrier ranges from 10 to 90% wt, preferably from 15 to 50% wt, still more preferably from 20 to 40% wt based on the total weight of dry catalyst. The amount of transition metal on the carrier is preferably 0.005-0.2 mmol/g of dry catalyst, still more preferably 0.01-0.1 mmol/g of dry catalyst.

The molar ratio of Al:transition metal in the catalyst system (dry) may range from 25 to 10,000, usually within the range of from 50 to 980 but preferably from 70 to 500 and most preferably from 100 to 350.

Particulate catalyst system can also be made using a boron activator instead of aluminoxane activator, e.g. as described in U.S. Pat. No. 6,787,608. In its example 1, an inorganic carrier is dehydrated, then surface modified by alkylaluminum impregnation, washed to remove excess alkylaluminum and dried. Subsequently the carrier is impregnated with an about equimolar solution of boron activator and trialkylaluminum, then mixed with a metallocene precursor, specifically a CGC metallocene, then filtered, washed and dried.

Also U.S. Pat. No. 6,350,829 describes the use of boron activator, but using mainly bis metallocene complexes as active site precursors. The dried metal alkyl-treated carrier is co-impregnated with a mixture of the metallocene and the boron activator (without additional metal alkyl), and then the volatiles removed.

The support material may also be mixed with the metallocene solution just before polymerization. U.S. Pat. No. 7,312,283 describes such a process. A porous metal oxide particulate material is impregnated with ammonium sulphate dissolved in water, and then calcined in dry air, kept under nitrogen, then mixed with a hydrocarbon liquid. Separately a solution was prepared by mixing metallocene with 1-alkene, and then mixing in metal alkyl. Polymerization was done in a continuous slurry reactor, into which both the sulphated particulate metal oxide and the metallocene solution were fed continuously, in such a way that the two feed streams were mixed immediately before entering the reactor. Thus the treated metal oxide functions both as an activator as well as a catalyst support.

Alternative methods of supporting single site catalysts via a preformed carrier and aluminoxane are given in EP 279 863, WO 93/23439, EP 793 678, WO 96/00245, WO 97/29134

Alternative methods of supporting single site catalysts via preformed carriers and boron activators are given in WO 91/09882 and WO 97/31038.

Methods of obtaining particulate catalyst systems without employing preformed carriers are given in EP 810 344 and EP 792 297.

Ziegler Natta Catalyst System

The Ziegler Natta catalyst system preferably comprises a transition metal component and an activator. Preferably, the transition metal component, when added to the polymerization reaction is contained within solid particles. Still more preferably, at least some activator (sometimes referred to as a cocatalyst) is added to the polymerization as a liquid or solution.

Catalyst System Particles

Transition Metal Component

The active site of the catalyst system is a transition metal. Group 4 or 5 transition metals are preferred, particularly Group 4 metals, and especially Ti. In particularly preferred Ziegler Natta catalysts only Group 4 transition metals (e.g. Ti) are present.

During preparation of the catalyst system it is preferred to use transition metals in the form of alkoxy or halide compounds, especially chlorides. Particularly preferably Ti, at the stage of its introduction into the catalyst system preparation process, is provided as $TiCl_4$.

The content of transition metal in the final solid catalyst based on the weight of dry, solid, catalyst component is preferably 0.1-5 mmol/g.

Preferably, the final solid catalyst particles also comprise a group 2 metal, preferably a magnesium compound, still more preferably a Mg—Cl compound, e.g. $MgCl_2$.

The magnesium compound may be introduced into the catalyst preparation as the Mg—Cl (e.g. $MgCl_2$ compound itself), but it is preferred to make it in situ within the catalyst preparation procedure to endure a high degree of dispersion, contact with the transition metal and porosity. The skilled man is aware of how to carry out such an in situ reaction.

The content of Mg in the final solid catalyst based on the weight of dry, solid, catalyst component is preferably 1-25 wt %.

Particle Building Material

The particle building material present in the catalyst system comprising a Ziegler Natta catalyst may be an inorganic oxide support such as silica, alumina, titania, silica-alumina and silica-titania or may be Mg or Ca compounds such as chlorides, oxychlorides, alkyls or alkoxides or metal salts with organic anions. Preferably, however, the material is silica or $MgCl_2$ with optional other components.

The particle building material preferably comprises 30-90 wt % of the final, dry, solid catalyst. If the particle building material comprises Mg—Cl compounds, then typically the building material will also function as the magnesium compound hereinbefore described. If the particle building material is a metal oxide, the metal oxide particles typically define the final catalyst system outer morphology and the other components of the catalyst system will be synthesized inside its pores.

Preformed carriers that are suitable for the preparation of Ziegler Natta catalyst systems are commercially available, e.g. from Grace and PQ Corporation. Preferred preformed carriers are those described above in section 4.4.1.1 entitled "Catalyst morphology and carrier".

Activator and Additional Components

The activator is a compound that is capable of activating the transition metal component. It is sometimes referred to as a cocatalyst. Useful activators are, amongst others, aluminium alkyls and aluminium alkoxy compounds. Especially preferred activators are aluminium alkyls, in particular, aluminium trialkyls (e.g. trimethyl aluminium, triethyl aluminium and tri-isobutyl aluminium). The activator is preferably used in excess to the transition metal component. For instance, when an aluminium alkyl is used as an activator, the molar ratio of the aluminium in the activator to the transition metal in the transition metal component is from 1 to 500 mol/mol, preferably 2 to 100 mol/mol, e.g. 5 to 50 mol/mol. The activator is typically not part of the solid, particulate catalyst but added to the polymerization reactor as a liquid.

The catalyst system comprising a Ziegler Natta catalyst may additionally comprise co-activators and/or modifiers. Thus, for example, two or more alkyl aluminium compounds as described above may be used and/or the catalyst system components may be combined with different types of ethers, esters, silicon ethers etc to modify the activity and/or selectivity of the catalyst system as is known in the art.

Catalyst System Preparation

The catalyst system comprising a Ziegler Natta catalyst may be prepared by procedures known in the art, e.g. as disclosed in U.S. Pat. No. 5,332,793, U.S. Pat. No. 6,187,866, U.S. Pat. No. 5,290,745, U.S. Pat. No. 3,901,863, U.S. Pat. No. 4,292,200, U.S. Pat. No. 4,617,360, WO 91/18934.

The solid catalyst system particles may optionally be washed prior to use to remove non bonded transition metal. In the final catalyst system particle added to the polymerization, only very minor amounts of transition metal should be extractable in alkanes at 80° C.

The average particle size of the catalyst system particles is preferably in the range 1 to 250 µm, more preferably 4 to 100 µm, still more preferably 6 to 30 µm, e.g. 10 to 25 µm. The particles are preferably spherical.

The surface area of the catalyst system particles is preferably in the range 1-500 $m^2/g$, more preferably 2-300 $m^2/g$. The pore volume of the catalyst system particles is preferably in the range 0.1-5 $cm^3/g$, preferably 0.2-1.5 $cm^3/g$.

Chromium Oxide Catalyst Systems

Procedures for making chromium oxide catalyst systems are well known in the art. Chromium oxide catalysts, also called Phillips catalysts, are typically made by calcining a porous powder of silica, silica-alumina or aluminium phosphate together with a Cr compound that is not heat stable, in a flow of dry, oxygen-containing gas at a temperature of 500-900° C. The Cr content is preferably 0.1-2% wt. They are preferably used without cocatalysts or activators, but sometimes minor amounts of Al or B alkyls are added to the polymerization reactor. The molecular weight of the polymer to be produced may be highly influenced by the temperature chosen for the calcination. Generally the higher the calcination temperature used, the lower the molecular weight of the resulting polymer.

The molecular weight of the polymer also depends on polymerisation conditions: The higher the polymerisation temperature, the lower the molecular weight. The higher the productivity (kg polymer/g catalyst), the higher the molecular weight. The higher the polymer density (less comonomer), the higher the molecular weight. (M. P. McDaniel: Supported Chromium Catalysts for Ethylene Polymerization, Adv. Catal., 33 (1985), 48.

Still, there is a limitation on how low molecular weight (how high MFR2) can be made by particle form (slurry or gas phase) commercial polymerisation process. This limitation means that only a fraction of the injection moulding polymer application market can be supplied by chromium oxide catalyst. Also, bimodal polymer grades are not produced by chromium due to the catalyst's inability to produce a low molecular weight fraction.

Multisite Catalyst Systems

Multisite catalyst systems may be used in the gas polymerization of the present invention.

Multisite catalyst systems for use in the polymerization may be hybrids from two (or more) different catalyst families. For instance, Ziegler Natta and single site catalytic sites may be used together, e.g. by impregnating metallocene site precursor and activator for the metallocene into the pores of a particulate Ziegler Natta catalyst. Alternatively, chromium oxide may be used together with a metallocene, e.g. by impregnating, under inert conditions, metallocene site precursor and activator for the metallocene into the pores of a particulate, thermally activated chromium oxide catalyst. Ziegler Natta and chromium oxide catalysts may also be used, e.g. as a system where the solid component of each of these catalysts are fed as separate particles to the polymerization reactor, and a relatively minor amount of the cocatalyst needed for the Ziegler Natta component is used. Alternatively, multisite catalyst systems comprising two different ZN sites, e.g. both Hf and Ti active sites, may be prepared.

Single site catalysts are particularly useful in the preparation of multisite catalyst systems. A preferred multisite catalyst system is one comprising two metallocenes, e.g. one having a tendency to make higher molecular weight polymer and one having a tendency to make lower molecular weight polymer or one having a tendency to incorporate comonomer and one having a lesser tendency to do so. The two metallocenes may, for instance, be isomeric metallocenes in about the same ratio as made in their synthesis. Preferably, however, the multisite catalyst system comprises one active site making a polymer component of both lower molecular weight and lower comonomer incorporation than another site. Dual site catalyst systems (multisite catalyst systems with two sites) containing such sites are particularly preferred.

Alternatively, chromium oxide catalysts may, in some cases, behave as dual site catalyst systems, e.g. if they are supported on aluminum phosphate (with a surplus of Al vs. P). This is believed to be due to the effect of the support influencing the properties of the active site.

High Catalyst Activity/Productivity

An important feature of the process of the present invention is that the above-described gas phase polymerization has a high activity coefficient in the copolymerisation of 3-substituted $C_{4-10}$ alkene and another $C_{2-8}$ alkene at a polymerization temperature of about 80° C. Preferably, the activity coefficient of the catalyst system is at least 100 g polyalkene/(g solid cat, h, bar), still more preferably the activity coefficient of the catalyst system is at least 200 g polyalkene/(g solid cat, h, bar), e.g. at least 250 g polyalkene/(g solid cat, h, bar). There is no upper limit on the activity coefficient, e.g. it may be as high as 10 000 g polyalkene/(g solid cat, h, bar).

Based on the total catalyst system, e.g. including liquid adjuvants such as activator added in liquid form, e.g. triethyl aluminium, preferably the activity coefficient of the catalyst system is at least 25 g polyalkene/(g total cat. system, h, bar), still more preferably the activity coefficient of the catalyst system is at least 40 g polyalkene/(g total cat. system, h, bar), e.g. at least 60 g polyalkene/(g total cat. system, h, bar). There is no upper limit on the activity coefficient, e.g. it may be as high as 500 g polyalkene/(g total cat. system, h, bar).

If a catalyst system comprising a single site catalyst is used, its activity coefficient is preferably least 5 000 g polyalkene/(mmol transition metal, h, bar), still more preferably the activity coefficient of the catalyst system is at least 8 000 g polyalkene/(mmol transition metal, h, bar), e.g. at least 12 000 g polyalkene/(mmol transition metal, h, bar).

The high activity coefficient, and therefore catalytic productivity of the process of the present invention, has many advantages. For instance, it decreases the production cost of the polymer and minimizes any safety risks associated with the handling of catalytic materials as less are required. Additionally the ability to use a lesser amount of catalyst system per kg of final polymer in some cases enables production plants to increase their production output without having to increase their reactor size or catalyst system material feed systems.

The high activity coefficient based on total catalyst system also means that the catalyst system residues may be left in the polymer without removal since they will not cause trouble in the further use of the polymer if the polymer is properly pretreated, e.g. several of the invention polymers were made into films, which is a rather critical application, without observing negative effects of the catalyst system residues, neither on the processing nor on the film itself.

Polymerization and Downstream Process
Polymerization Process
Commercial Processes The gas phase polymerization is preferably carried out in a conventional gas phase reactor such as a bed fluidized by gas feed or in a mechanically agitated bed, or in a circulating bed process. Suitable gas phase polyalkene processes for polyethylene are, for example, Unipol PE gas feed fluidized single reactor process and Unipol PE II gas feed fluidized staged reactor process by Univation, Evolue gas feed fluidized staged reactor process by Mitsui, Innovene gas fed fluidized single reactor process by Ineos, Lupotech G gas fed fluidized single reactor process and Spherilene gas feed fluidized staged reactor process by LyondellBasell and last part of Borstar PE staged reactor process by Borealis. Suitable gas phase polyalkene processes for polypropylene are, for example, Innovene PP by Ineos, Dow/Unipol PP by Dow, Spherizone circulating bed by LyondellBasell, Chisso/JPP mechanically agitated reactor process by Japan Polypropylene, Novolen gas phase by Lummus and last polymerization part of Spheripol process by LyondellBasell.

Gas Phase Reactor Parameters and Operation

The high activity of the polymerization catalyst systems with 3-substituted $C_{4-10}$ alkene comonomer allow for efficient gas phase polymerization to be carried out. Preferably, the productivity of the solid catalyst is at least 1000 g polymer per g of solid catalyst system. Still more preferably the productivity of the solid catalyst is at least 1800 g polymer/g catalyst system, e.g. at least 2000 g polymer/g solid catalyst system. The upper limit is not critical but might be in the order of 100 000 g polymer/g solid catalyst system. Preferably, the productivity of the total catalyst system is at least 250 g polymer per g of total catalyst system. Still more preferably the productivity of the solid catalyst is at least 400 g polymer/g catalyst total system, e.g. at least 1000 g polymer/g catalyst system. The upper limit is not critical but might be in the order of 20000 g polymer/g solid catalyst.

Advantageously, the process typically proceeds without reactor fouling.

The conditions for carrying out gas phase polymerization are well established in the art. The reaction temperature is preferably in the range 30 to 120° C., e.g. 50 to 100° C. The total gauge pressure is preferably in the range 1 to 100 bar, e.g. 10 to 40 bar. The total monomer partial pressure is preferably in the range 2 to 20 bar, e.g. 3 to 10 bar. The residence time in each gas phase reactor is preferably in the range 0.3 to 7 hours, more preferably 0.5 to 4 hours, still more preferably 0.7 to 3 hours, e.g. 0.9 to 2 hours.

Hydrogen is also preferably fed into the reactor to function as a molecular weight regulator. In the case of single site catalysts and especially for catalysts with Group 4 metallocenes with at least one cyclopentadienyl group, the molar ratio between the feed of hydrogen and the feed of the $C_{2-8}$ alkene into the reactor system is preferably 1:10 000-1:2000. In the case of ZN catalysts, the $H_2/C_{2-8}$ alkene molar ratio within the gas phase of the polymerization reactor is preferably 1:5 000-1.0

The concentration in the gas in the reactor of the major monomer, the $C_{2-8}$ alkene, is preferably is 10-70 mol %, preferably 20-50 mol %, while the 3-substituted $C_{4-10}$ alkene comonomer concentration preferably is 1-70 mol %, more preferably 5-50 mol %.

Preferably, nitrogen is also fed into the reactor. It functions as a flushing gas.

Preferably, a $C_{3-8}$ saturated hydrocarbon is also fed into the reactor. Particularly preferably a $C_{3-6}$ alkane (e.g. propane, n-butane) is fed into the reactor. It functions to increase heat transfer efficiency, thereby removing heat more efficiently from within the reactor.

Preferably, the gas phase polymerization reaction is carried out as a continuous or semi-continuous process. Thus the monomers, hydrogen and other optional gases are preferably fed continuously or semi-continuously into the reactor. Preferably, the catalyst system is also fed continuously or semi-continuously into the reactor. Still more preferably polymer is continuously or semi-continuously removed from the reactor. By semi-continuously is meant that addition and/or removal is controlled so they occur at relatively short time intervals compared to the polymer residence time in the reactor, e.g. between 20 seconds to 2 minutes, for at least 75% (e.g. 100%) of the duration of the polymerization.

Thus in a preferred process of the present invention the catalyst components or catalyst system is preferably injected into the reactor at a rate equal to its rate of removal from the reactor. An advantage of the invention herein described, however, is that because less catalyst system can be used per kg of polymer produced, less catalyst system is removed from the reactor along with polymer. The interpolymers obtained directly from the polymerization reactor(s) therefore comprise less impurities deriving from the catalyst system.

When used in a gas phase polymerization of a 3-substituted $C_{4-10}$ alkene comonomer, the polymerization catalyst system herein described, particularly the single site catalyst system, gives a very high activity, enabling a high productivity (g polymer/g catalyst system). Consequently relatively low concentrations of catalyst system are required in the reactor. Preferably, the concentration of the total catalyst system in the gas phase polymerization is less than 3 kg/ton polymer, still more preferably less than 1.0 kg/ton polymer, e.g. less than 0.8 kg/ton polymer. Preferably, the concentration of catalyst system is at least 0.01 kg/ton polymer.

The above-described gas phase polymerization may be combined with one or more further polymerizations, i.e. in a multistage process. Thus, for example, two gas phase polymerizations can be carried out in sequence (e.g. UNIPOL II, Evolue, Spherilene, Novolen processes, Spheripol process option) or a gas polymerization can be preceded by a slurry phase polymerization (e.g. in Borstar or Spheripol processes). Alternatively, a gas phase polymerization may be followed by a slurry phase polymerization.

When a polymer is produced in a multistage process, the reactors may be in parallel or in series but arrangement in series is preferred. If the polymer components are produced in a parallel arrangement, the powders are preferably mixed and extruded for homogenization.

When a polymer is produced in a sequential multistage process, using reactors coupled in series and using different conditions in each reactor, the polymer components produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima. The product of a multistage polymerization is usually a multimodal polyalkene.

If a slurry phase polymerization is additionally employed then the conditions are preferably as follows:
- the temperature is within the range of 30-120° C., preferably 50-100° C.
- the reaction pressure is within the range of 1-100 bar, preferably 10-70 bar
- the residence time is typically 0.5 to 6 hours, e.g. 1 to 4 hours
- the diluent used is preferably an aliphatic hydrocarbon having a boiling point in the range −70 to 100° C., e.g. n-hexane, isobutane, propane
- hydrogen may be added for controlling the molar mass in a manner known in the art.

Monomer (e.g. ethylene) and optionally a 3-substituted $C_{4-10}$ alkene comonomer is fed to the slurry reactor. Alternatively, another comonomer may be added together with the 3-substituted $C_{4-10}$ alkene comonomer. Alternatively, no comonomer may be added. When no comonomer is added in the slurry phase polymerization, the polymer component from the slurry phase polymerization is an alkene homopolymer.

The polymerization may be conducted in a manner known in the art such as in a conventional loop or tank reactor.

Staged processes for polyethylene preferably produce a combination of a major component A of lower molecular weight and lower (especially preferred is zero when producing final products of density higher than 940 g/dm$^3$) comonomer content and one major component B of higher molecular weight and higher comonomer content. Component A is preferably made in a reactor A' wherein the hydrogen level is higher and the comonomer level lower than in the reactor B' where component B is made. If reactor A' precedes B', it is preferred that hydrogen should be stripped off from the polymer flow from A' to B'. If reactor B' precedes A', then preferably no extra comonomer is added to reactor B', and it is preferred to remove a significant part of the non converted comonomer from the polymer flow from B' to A'. It is also preferred that the 3-substituted $C_{4-10}$ alkene is used in the reactor where the polymer with highest incorporation of comonomer is produced, and especially preferred in all the reactors of the process where comonomer is used.

When a two stage polymerization is utilized, the lower molecular weight polymer component is preferably produced in a slurry reactor as described above and the higher molecular weight component produced in a gas phase reactor. The higher molecular weight component is typically produced using a lower hydrogen/monomer feed. The reactors are preferably connected in series. Preferably, the same catalyst system is used in both reactors. The lower molecular weight component may be an interpolymer (e.g. copolymer) or homopolymer.

A prepolymerization may be employed as is well known in the art. In a typical prepolymerization less than about 5% wt of the total polymer is produced. A prepolymerization does not count as a stage with regard to consideration of whether a process is a single or multistage process.

Preferably, however, the process of the present invention is a single stage polymerization in a gas phase reactor.

Multimodal polymers may alternatively be prepared by using two or more different single site catalysts in a single reactor.

Alternatively, multisite catalyst systems, as described above, may be used to prepare multimodal polymers. In this case, in order to achieve the optimum polymer properties, especially in a single reactor system, it is preferably for the multisite catalyst system to have as high a ratio as possible between the incorporation of comonomer on a site I and on another site II. It has been surprisingly found that the 3-substituted $C_{4-10}$ alkene comonomer as hereinbefore described, for numerous combinations of active sites, gives a higher ratio compared to the corresponding reaction using conventional comonomers like 1-butene and 1-hexene. Utilizing 3-substituted $C_{4-10}$ alkene with a multisite catalyst system is therefore especially favorable.

Multimodal polymer may therefore be obtained in a single reactor or in a system of two or more reactors, e.g. in a staged reactor process. Preferably, however, a single reactor process (except optional prepolymerization reactors making less than 7% of the total polymer) is used. Preferably, a multisite catalyst system comprising two or more (e.g. two) metallocene active site precursors is used.

A further possibility is to blend different interpolymers as hereinbefore described, e.g. prior to pelletization. Blending is, however, less preferable to the production of multimodal polymer, e.g. by multistage polymerization or by the use of two or more different single site catalysts in a single reactor.

Multimodal and Unimodal Polymers

Multimodal interpolymers as hereinbefore described, and especially those wherein the higher molecular weight polymer component A has a higher comonomer content than the lower molecular weight component B, may in some instances possess some advantages over unimodal interpolymers.

Compared to unimodal interpolymer, at the same density and at the same high ease of extrusion as regards extruder screw and die processes, a multimodal interpolymer comprising, e.g. ethylene and a 3-substituted $C_{4-10}$ alkene, may be prepared having a higher stress crack, brittle crack hoop stress failure and/or slow crack growth resistance. Such interpolymers are particularly useful for moulding and pipe applications where they give improved resistance to stress crack and slow crack propagation as well as in film applications wherein they enable improved impact resistance and often improved tear resistance.

Additionally, multimodal interpolymers as hereinbefore described also have higher melt strength, equivalent to sagging resistance, which is an advantage in extrusion of large pipes and blow moulding of articles, especially of large pieces.

Multimodal interpolymers as hereinbefore described may also exhibit improved sealing properties (e.g. lower minimum sealing temperature, sealing temperature range broadness)

compared to an unimodal polymer of the same density and ease of extrusion. This is particularly useful in the manufacture of films.

On the other hand, unimodal interpolymers as hereinbefore described often have a lower viscosity at very low shear stress compared to multimodal interpolymers. This is useful, for example, in rotomoulding processes where better mechanical strength of the product can be achieved with the same cycle time. Furthermore such interpolymers may possess a low degree of warpage making them advantageous for injection moulding.

3-Substituted $C_{4-10}$ Alkene in Heat Removal

As mentioned above, the gas phase polymerization reaction preferably comprises a $C_{3-8}$ saturated hydrocarbon such as a $C_{3-6}$ alkane. The function of the $C_{3-8}$ saturated hydrocarbon is to increase the heat removal efficiency in the gas phase reactor. Cooling of particles is achieved by circulating the $C_{3-8}$ saturated hydrocarbon within the reactor through the polymerization zone where it picks up heat from the particles, to a cooling surface, where it is cooled, and then recycled. This process is important, since if any particle overheats sufficiently, it will melt and stick together with another particle or with the reactor wall, i.e. agglomerate. $C_3$-$C_6$ hydrocarbons have higher specific heat capacity than nitrogen and have been found to function more efficiently for heat removal than e.g. nitrogen.

Thus in a typical gas phase polymerization, in addition to the monomers, there is usually added a substantial concentration of $C_{3-8}$ saturated hydrocarbon, e.g. $C_{3-6}$ alkane. For instance, the concentration of $C_{3-8}$ saturated hydrocarbon in the reactor may be in the order of 5-60 mol %.

It has now been found, however, that 3-substituted $C_{4-10}$ alkenes such as 3-methyl-but-1-ene can act as an effective in situ means for removing heat. It is possible, and in many cases preferable, to utilize a relatively high partial pressure of 3-substituted $C_{4-10}$ alkene in gas phase polymerization and it has been found that it serves as a means to remove heat from the reactor. This is a further advantage of using a 3-substituted $C_{4-10}$ alkene comonomer instead of e.g. a linear 1-butene or 1-hexene. In this way, the cooling can be improved and the amount of $C_{3-8}$ saturated hydrocarbon, e.g. $C_3$-$C_6$ alkane, can be reduced. The advantage of eliminating addition of $C_{3-8}$ saturated hydrocarbon, e.g. $C_{3-6}$ alkane, is that this alkane must be acquired, purified, added, controlled, removed from the reactor and the polymer and separated from the gas mixture, especially in quantities.

An advantage of the above-described gas phase polymerization is therefore that it can be carried out with no additional $C_{3-8}$ saturated hydrocarbon or with less additional $C_{3-8}$ saturated hydrocarbon. In preferred gas phase polymerizations the concentration of $C_{3-8}$ saturated hydrocarbon, e.g. $C_{3-6}$ alkane, is therefore less than 20% mol, more preferably less than 10% mol, still more preferably less than 5% mol. In some cases substantially no $C_{3-8}$ saturated hydrocarbon, e.g. $C_{3-6}$ alkane may be present.

In a further preferred gas phase polymerization the molar ratio of $C_{3-8}$ saturated hydrocarbon, e.g. $C_{3-6}$ alkane, to 3-substituted $C_{4-10}$ alkene is less than 2:1, preferably less than 1:1, more preferably less than 1:2, e.g. less than 1:9.

The partial pressure of 3-substituted $C_{4-10}$ alkene present in the gas phase reactor is preferably at least 10% of the total pressure, more preferably at least 20% of the total pressure, e.g. at least 40% of the total pressure.

For instance, a gas phase polymerization may be carried out under the following conditions:
a concentration of $C_{3-6}$ alkane of 0.01-5 mol %
a concentration of nitrogen, 10-40 mol %,
a concentration of ethylene of 10-50 mol %,
a partial pressure of 3-substituted $C_{4-10}$ alkene (e.g. 3-methyl but-1-ene) of more than 20% of the total pressure in the reactor, and
a concentration of hydrogen of, e.g. 1-5 mol % for ZN or chromium oxide catalysts and 5 to 1000 ppm mol for single site catalysts.

Thus viewed from a further aspect the present invention provides a method of carrying out a gas phase polymerization comprising polymerizing a 3-substituted $C_{4-10}$ alkene and optionally another $C_{2-8}$ alkene using a polymerization catalyst system, wherein said polymerization is carried out at a concentration of $C_{3-8}$ saturated hydrocarbon (e.g. $C_{3-8}$ alkane) of less than 5 mol %.

Preferably, the feed of $C_{3-8}$ saturated hydrocarbon (e.g. $C_{3-6}$ alkane) into the gas phase reactor system (reactor+recirculation system) is less than 100 kg/ton polyethylene, preferably less than 30 kg/ton polyethylene, more preferably less than 10 kg/ton polyethylene.

Condensed/Supercondensed Mode, Optionally with Comonomer as Condensable

It has been found that the increased catalytic activity discussed above that is achieved using the 3-substituted $C_{4-10}$ alkene comonomer is most significant at relatively short residence times (e.g. within the first hour). Of course, it is at short residence times that the need for high catalytic activity is greatest, since then is the greatest amount of catalyst system or catalyst residue incorporated into the polymer.

However gas phase reactors, especially when fed non polymerized catalyst systems, sometimes encounter operational difficulties if operated in a conventional manner with short residence times due to local overheating by insufficient control over local cooling. Short residence times in gas phase polymerization reactors are therefore achieved by using what is called condensed or supercondensed operation mode. A preferred gas phase polymerization of the invention is therefore carried out in condensed or supercondensed mode. This is an operational mode wherein a vaporizable liquid is continuously fed to the fluidized bed polymerization reactor (U.S. Pat. No. 453,399, U.S. Pat. No. 4,588,790, U.S. Pat. No. 5,352,749, U.S. Pat. No. 5,405,922), in order to increase cooling efficiency and cooling control. Supercondensed mode usually refers to a situation of fluid feed of more than about 20% wt liquid of total fluid feed. The condensed mode may be used by partial condensing of the comonomer only, but the amount of condensibles and the dewpoint of the recirculation gas is very often adjusted by added alkanes, such as $C_3$-$C_6$, especially $C_5$ into the reactor system, so the alkane in or from the recirculation gas will also be partially condensed. Thus the combination of continuous gas phase polymerization with continuous vaporizable liquid feed to the reactor bed is favorable and especially preferred.

It has been found that 3-substituted $C_{4-6}$ alkenes, and in particular those with 5-7 carbon atoms in total (e.g. 3-methyl-1-butene and 3-methyl-1-pentene, especially 3-methyl-1-butene) are ideal vaporizable liquids for condensed mode operation. In comparison to the standard linear comonomers, the 3-substituted $C_{4-6}$ alkenes may be used in a much higher concentration in the reactor without impacting on the nature of the interpolymer obtained which enables a much higher degree of condensation of the recirculation gas. It is possible to run operation in condensed mode with essentially no added saturated $C_{3-6}$ alkanes.

Thus viewed from a still further aspect the invention provides the use of 3-substituted $C_{4-10}$ alkene in a gas phase polymerization, wherein said alkene constitutes more than 5 wt % of a vaporizable liquid that is continuously fed to the gas phase polymerization reactor.

When operating in condensed mode, the concentration of 3-substituted $C_{4-10}$ alkene gas in the gas in the reactor is preferably more than 10 mol %, more preferably more than 20 mol %, e.g. more than 30 mol %. Preferably, the concentration of 3-substituted $C_{4-10}$ alkene in condensed liquid feed flow to the gas phase reactor is 10-99 mol %, more preferably 25-98 mol %, e.g. 50-96 mol %. The condensed liquid flow to the reactor of total recirculation gas out from reactor is preferably 3-60 wt %, e.g. 5-40 wt %.

The optimum comonomer strategy may be to use a mixture of a 3-substituted $C_{4-6}$ alkene with a linear alkene comonomer, e.g. butene. At a relatively high density, there is preferred a high proportion of the 3-substituted $C_{4-6}$ alkene for a high concentration of condensibles, product properties and activity. At very low density polymer, the balance is shifted to the linear comonomer in order that the total comonomer concentration does not get excessively high, e.g. so the dew point in the reactor gets too close, and there must be some partial pressure left for ethylene and the indispensable part of nitrogen also.

Downstream Requirements and Process

When the final polymer product is obtained from a slurry reactor, the polymer is removed therefrom and the diluent preferably separated from it by flashing or filtration. The major part of the diluent and unconverted comonomer is recycled back to the polymerization reactor(s). Preferably, the polymer is then dried (e.g. to remove residues of liquids and gases from the reactor). Due to its relatively low content of catalyst system residues, preferably the polymer is not subjected to a deashing step, i.e. to washing with an alcohol, optionally mixed with a hydrocarbon liquid, or water.

The polymer obtained from gas phase polymerization is preferably dried. Otherwise the final polymer is obtained from a gas phase reactor is preferably used without removing catalyst system residues or polymer components.

In order that the polymer can be handled without difficulty, both within and downstream of the polymerization process, the polymer powder from the reactor(s) should be in a free-flowing state, preferably by having relatively large particles of high bulk density, e.g. less than 10% wt of the polymer being smaller than 100 μm size, and the loose bulk density being higher than 300 kg/m³.

Preferably, the processes from the polymerization until the pelletization extruder outlet, are carried out under an inert (e.g. $N_2$) gas atmosphere.

Antioxidants are preferably added (process stabilizers and long term antioxidants) to the polymer. As antioxidant, all types of compounds known for this purpose may be used, such as sterically hindered or semi-hindered phenols, aromatic amines, aliphatic sterically hindered amines, organic phosphates and sulphur-containing compounds (e.g. thioethers).

Preferably, the antioxidant is selected from the group of organic phosphates and sterically hindered or semi-hindered phenols, i.e. phenols which comprise two or one bulky residue(s), respectively, in ortho-position to the hydroxy group, and sulphur containing compounds.

Representative examples of sterically hindered phenolic compounds include 2,6-di-tert.-butyl-4-methyl phenol; pentaerythrityl-tetrakis(3-(3',5'-di-tert.-butyl-4-hydroxyphenyl)-propionate; octadecyl 3-(3',5'-di-tert.-butyl-4-hydroxyphenyl)propionate; 1,3,5-trimethyl-2,4,6-tris-(3,5-di-tert.-butyl-4-hydroxyphenyl)benzene; 2,2'-thiodiethylene-bis-(3,5-di-tert.-butyl-4-hydroxyphenyl)-propionate; calcium-(3,5-di-tert.-butyl-4-hydroxy benzyl monoethyl-phosphonate); 1,3,5-tris(3',5'-di-tert.-butyl-4'-hydroxybenzyl)-isocyanurate; bis-(3,3-bis-(4'-hydroxy-3'-tert.-butylphenyl)butanoic acid)-glycolester; 4,4'-thiobis(2-tert.-butyl-5-methylphenol); 2,2'-methylene-bis(6-(1-methyl-cyclohexyl)paracresol); n,n'-hexamethylene bis(3,5-di-tert. Butyl-4-hydroxy-hydrocinnamamide; 2,5,7,8-tetramethyl-2-(4',8',12'-trimethyltridecyl)chroman-6-ol; 2,2'-ethylidenebis(4,6-di-tert.-butylphenol); 1,1,3-tris(2-methyl-4-hydrosy-5-tert.-butylphenyl)butane; 1,3,5-tris(4-tert.-butyl-3-hydroxy-2,6-dimethylbenzyl)-1,3,5-triazine-2,4-,6-(1h,3h,5h)-trione; 3,9-bis(1,1-dimethyl-2-(beta-(3-tert.-butyl-4-hydroxy-5-methylphenyl)prop-ionyloxy)ethyl)-2,4,8,10-tetraoxaspiro (5,5) undecane; 1,6-hexanediyl-bis(3,5-bis(1,1-dimethylethyl)-4-hydroxybenzene-propanoate); 2,6-di-tert.-butyl-4-nonylphenol; 3,5-di-tert.-butyl-4-hydroxyhydrocinnamic acid triester with 1,3,5-tris(2-hydroxyethyl)-s-triazine-2,4,6 (1h,3h,5h)-trione; 4,4'-butylidenebis(6-tert.butyl-3-methylphenol); 2,2'-methylene bis(4-methyl-6-tert.-butylphenol); 2,2-bis(4-(2-(3,5-di-t-butyl-4-hydroxyhydrocinnamoyloxy)) ethoxyphenyl))propane; triethyleneglycole-bis-(3-tert.-butyl-4-hydroxy-5-methylphenyl)propionate; benzenepropanoic acid, 3,5-bis(1,1-dimethylethyl)-4-hydroxy-$c_{7-9}$-branched and linear alkyl esters; 6,6'-di-tert.-butyl-2,2'-thiodi-p-cresol; diethyl((3,5-bis(1,1-dimethylethyl)-4-hydroxyphenyl)methyl)phosphonate; 4,6-bis (octylthiomethyl)o-cresol; benzenepropanoic acid, 3,5-bis(1,1-dimethylethyl)-4-hydroxy-$c_{7-9}$-branched and linear alkyl esters; 1,1,3-tris[2-methyl-4-[3-(3,5-di-t-butyl-4-hydroxyphenyl)propionyloxy]-5-t-butylphenyl]butane; and a butylated reaction product of p-cresol and dicyclopentadiene.

Among those compounds, the following phenolic-type antioxidant compounds are especially preferred to be included: pentaerythrityl-tetrakis(3-(3',5'-di-tert.-butyl-4-hydroxypheyl)-propionate; octadecyl 3-(3',5'-di-tert.-butyl-4-hydroxyphenyl)propionate; 1,3,5-trimethyl-2,4,6-tris-(3,5-di-tert.-butyl-4-hydroxyphenyl)benzene; 1,3,5-tris(3',5'-di-tert.-butyl-4'-hydroxybenzyl)isocyanurate, bis-(3,3-bis-(4'-hydroxy-3'-tert.-butylphenyl)butanoic acid)-glycolester; and 3,9-bis(1,1-dimethyl-2-(beta-(3-tert.-butyl-4-hydroxy-5-methylphenyl)propionyloxy)ethyl)-2,4,8,10-tetraoxaspiro (5,5)undecane.

Preferred organic phosphate antioxidants contain a phosphite moiety or a phosphonite moiety. Representative examples of preferred phosphite/phosphonite antioxidants include tris(2,4-di-t-butylphenyl)phosphite; tetrakis-(2,4-di-t-butylphenyl)-4,4'-biphenylen-di-phosphonite, bis(2,4-di-t-butylphenyl)-pentaerythrityl-di-phosphite; di-stearyl-pentaerythrityl-di-phosphite; tris-nonylphenyl phosphite; bis(2, 6-di-t-butyl-4-methylphenyl)pentaerythrityl-di-phosphite; 2,2'-methylenebis(4,6-di-t-butylphenyl)octyl-phosphite; 1,1, 3-tris(2-methyl-4-ditridecyl phosphite-5-t-butylphenyl)butane; 4,4'-butylidenebis(3-methyl-6-t-butylphenyl-di-tridecyl)phosphite; bis(2,4-dicumylphenyl)pentaerythritol diphosphite; bis(2-methyl-4,6-bis(1,1-dimethylethyl)phenyl)phosphorous acid ethylester; 2,2',2"-nitrilo triethyl-tris (3,3'5,5'-tetra-t-butyl-1,1'-biphenyl-2,2'-diyl)phosphite); phosphorous acid, cyclic butylethyl propandiol, 2,4,6-tri-t-butylphenyl ester; bis(2,4,6-tri-t-butylphenyl)-pentaerythrityl-di-phosphite; 2,2'-ethylidenebis(4,6-di-t-butylphenyl) fluorophosphonite, 6-(3-tert-butyl-4-hydroxy-5-methylphenyl)propoxy)-2,4,8,10-tetra-tert.but-yldibenz(d,t) (1.3.2)dioxaphosphepin; and tetrakis-(2,4-di-t-butyl-5-methyl-phenyl)-4,4'-biphenylen-di-phosphonite.

Among the above-mentioned compounds, the following phosphite/phosphonite antioxidant compounds are preferred to be included: tetrakis-(2,4-di-t-butylphenyl)-4,4'-biphenylen-di-phosphonite; bis(2,6-di-t-butyl-4-methylphenyl) pentaerythrityl-di-phosphite; di-stearyl-pentaerythrityl-diphosphite; and bis(2,4-dicumylphenyl)pentaerythritol diphosphite.

As antioxidant either a single compound or a mixture of compounds may be used. Particularly preferably a sterically hindered phenolic compound and a phosphite/phosphonite compound may be used in combination. The sterically hindered phenolic compound typically acts as a long term stabilizer. The phosphite/phosphonite compound typically acts as a process stabilizer.

The skilled man can readily determine an appropriate amount of antioxidant to include in the polymer. As discussed above, however, the polymers produced by the process of the present invention comprise less catalyst system residues than conventional polymers thus it is possible to add less antioxidant thereto. Thus a sterically hindered phenolic antioxidant may be used in an amount of 200-1000 ppmwt, more preferably 300-800 ppmwt, e.g. 400-600 ppmwt or about 500 ppmwt. The amount of organic phoshite/phosphonite antioxidant present in the polymer is preferably 50-500 ppmwt, more preferably 100-350 ppmwt and most preferably 150-200 ppmwt.

The above-mentioned antioxidants are particularly preferred when the amount of transition metal present in the polymer is sufficient to accelerate oxidation reactions, e.g. when the level of transition metal in the polymer is more than 1 µmol transition metal per kg polymer, more typically more than 2 µmol transition metal per kg polymer, e.g. more than 6 µmol transition metal per kg polymer. Such levels of transition metals may occur as the interpolymers are often prepared without a washing (e.g. deashing) step.

Other additives (antiblock, color masterbatches, antistatics, slip agents, fillers, UV absorbers, lubricants, acid neutralizers and fluoroelastomer and other polymer processing agents) may optionally be added to the polymer.

Prior to introduction into the plastic converter, the polymer is preferably further processed to achieve less than 10% wt of the polymer being smaller than 2 mm in average size (weight average) and a loose bulk density of higher than 400 kg/m$^3$.

The polymer or polymer mix is preferably extruded and granulated into pellets. Prior to extrusion, the polymer preferably contacts less than 1 kg/ton, still more preferably less than 0.1 kg/ton, water or alcohol. Prior to extrusion, the polymer preferably does not contact acid.

Additives (e.g. polymer processing agents or antiblock) may be added after pelletization of the polymer. In this case the additives are preferably used as masterbatches and pellets mixed therewith before being extruded or moulded into films or articles.

Polymer Composition and Properties

The amount of $C_{2-8}$ alkene (e.g. ethylene) monomer present in the interpolymer of the invention is preferably 60-99.99% wt, still more preferably 80-99.9% wt, e.g. 90-99.5% wt. In interpolymers wherein the largest amount of $C_{2-8}$ alkene is propylene, preferably at least 3-10% wt of ethylene is additionally present. If the interpolymer comprises two types of $C_{2-8}$ alkenes (e.g. ethylene and 1-butene), the $C_{2-8}$ alkene in the minor amount (e.g. 1-butene) is preferably present in an amount 0.1-20% wt, still more preferably 0.5-10% wt, e.g. 1-7% wt.

The amount of 3-substituted $C_{4-10}$ alkene (e.g. 3-methyl-1-butene) monomer present in the interpolymer of the invention is preferably 0.01 to 40% wt, more preferably 0.1-20% wt, e.g. 0.5-10% wt, more preferably less than 7% wt.

When it is stated herein that the amount of a given monomer present in a polymer is a certain amount, it is to be understood that the monomer is present in the polymer in the form of a repeat unit. The skilled man can readily determine what is the repeat unit for any given monomer.

The density of the interpolymer of the invention is preferably in the range 835-970 kg/m$^3$. When the $C_{2-8}$ alkene is ethylene, the density is preferably in the range 880-950 kg/m$^3$, still more preferably in the range 900-940 kg/m$^3$, e.g. 915-930 kg/m$^3$.

When the $C_{2-8}$ alkene is propylene, the density is preferably in the range 880-910 kg/m$^3$, still more preferably in the range 885-910 kg/m$^3$, e.g. 890-910 kg/m$^3$. When the $C_{2-8}$ alkene is propylene, the xylene solubles of the interpolymer is preferably in the range 0.5-30% wt, more preferably 1-10% wt, e.g. 3-8% wt.

The MFR$_2$ of the interpolymer of the invention is preferably in the range 0.01-1000 g/10 min. When the $C_{2-8}$ alkene is ethylene, the MFR$_2$ of the polymer is preferably in the range 0.01-1000 g/10 min, more preferably in the range 0.05-500 g/10 min, e.g. 0.1-5 g/10 min. When the $C_{2-8}$ alkene is propylene, the MFR$_2$ of the polymer is preferably in the range 0.1-1000 g/10 min, more preferably in the range 1-150 g/10 min, e.g. 10-50 g/10 min.

The MFR$_{21}$ of the interpolymer of the invention is preferably greater than 0.01 g/10 min. When the $C_{2-8}$ alkene is ethylene, the MFR$_{21}$ of the polymer is preferably greater than 0.05 g/10 min, more preferably greater than 0.1 g/10 min, e.g. greater than 1 g/10 min. The upper limit of MFR$_{21}$ is not critical and might be 300 g/10 min.

The melting temperature of the interpolymer of the invention is preferably in the range 90-240° C. When the $C_{2-8}$ alkene is ethylene, the melting temperature is more preferably in the range 100-140° C., still more preferably in the range 110-130° C., e.g. 115-125° C. When the $C_{2-8}$ alkene is propylene, the melting temperature is more preferably in the range 120-160° C., still more preferably in the range 130-155° C., e.g. 135-150° C.

The Mn of the interpolymer of the invention is preferably in the range 4000-500 000 g/mol. When the $C_{2-8}$ alkene is ethylene, the Mn is more preferably in the range 7000-250 000 g/mol, still more preferably in the range 10 000-150 000 g/mol, e.g. 20 000-70 000 g/mol. When the $C_{2-8}$ alkene is propylene, the Mn is more preferably in the range 6000-100 000 g/mol, still more preferably in the range 8000-70 000 g/mol, e.g. 15 000-50 000 g/mol.

The weight average molecular weight (Mw) of the interpolymer of the invention is preferably in the range 20 000-1000 000 g/mol. When the $C_{2-8}$ alkene is ethylene, the weight average molecular weight is more preferably in the range 30 000-700 000 g/mol, still more preferably in the range 50 000-150 000 g/mol, e.g. 70 000-140 000 g/mol. When the $C_{2-8}$ alkene is propylene, the weight average molecular weight is more preferably in the range 30 000-700 000 g/mol, still more preferably in the range 50 000-400 000 g/mol, e.g. 80 000-200 000 g/mol.

The Mw/Mn of the interpolymer of the invention is preferably in the range 1.5-50. When the $C_{2-8}$ alkene is ethylene, the Mw/Mn of the interpolymer is preferably in the range 1.5-50, more preferably in the range 2-30, e.g. 2-5. When the $C_{2-8}$ alkene is propylene, the Mw/Mn is more preferably in the range 1-10, more preferably in the range 2-10, e.g. 2-5. When the polymer is multimodal, each component made using a single site catalyst preferably has a $M_w/M_n$ in the range 2-5, more preferably in the range 2-4, most preferably in the range 2-3.5. When the polymer is multimodal, each component made with a Ziegler-Natta catalyst preferably has a $M_w/M_n$ in the range 4-12, more preferably in the range 5-10, most preferably in the range 6-9.

Preferably, the interpolymer of the present invention is unimodal.

The polymer chains of the interpolymer of the present invention may be linear in the sense that they have no measurable long chain branching. Alternatively, they may have some degree of long chain branching, which may be made e.g. by certain catalytic sites, especially metallocene such as CGC metallocenes, or by polymerization with dienes or by post reactor modification, e.g. via radicals. If present, however, long chain branching is preferably introduced during polymerization without adding extra reactants, e.g. by using a mono-Cp metallocene as discussed above or metallocenes with two Cp rings (including indenyl and fluorenyl) and having a single bridge between the Cp rings. Long chain branching gives useful rheological properties similar to broader molecular weight polymers (and thereby improved processing behavior) while in reality maintaining a relatively narrow molecular weight distribution, e.g. as measured by GPC.

The interpolymer of the present invention is obtained with high purity. It may, for example, be used without a deashing or washing step. Thus the interpolymer contains only very low amounts of catalyst system or catalyst residues (i.e. ash). Preferably, the amount of catalyst system residue (i.e. ash) in the interpolymer of the invention is less than 1200 ppm wt ash, still more preferably less than 600 ppm wt ash, e.g. less than 500 ppm wt ash. By the catalyst system ash is meant the ash from the active site precursor, activator, carrier or other catalyst particle construction material and any other components of the catalyst system that are present after polymerization and prior to any deashing, washing or additivation step.

Transition metals are harmful in films in far lower concentrations since they act as accelerators for degradation of the polymer by oxygen and temperature, giving discoloration and reducing or destroying mechanical properties. A particular advantage of the process of the present invention is that it yields polymers containing very low amounts of transition metal. Polymers produced by the process of the invention preferably comprise less than 500 µmol transition metal per kg polymer, more preferably less than 400 µmol transition metal per kg polymer, still more preferably less than 200 µmol transition metal per kg polymer, e.g. less than 100 µmol transition metal per kg polymer.

Applications

The interpolymer of the present invention is therefore useful in a wide range of applications. It may be used, for example, in medical applications, for the manufacture of packaging for food or for electrical applications wherein it is important that the amount of impurities present in the polymer is minimized.

The interpolymer may also be used in moulding as well as in pipe applications.

Moulding

The interpolymer of the present invention may be advantageously used in moulding applications. It may, for example, be used in blow moulding, injection moulding or rotomoulding.

Representative examples of blow moulded articles that may be prepared include bottles or containers, e.g. having a volume of 200 ml to 300 liters. Preferred interpolymers for blow moulding have a density of more than 945 g/dm$^3$, e.g. 945-970 g/dm$^3$. Preferred interpolymers for blow moulding have a MFR$_{21}$ of 1-40 g/10 min.

Particularly preferred interpolymers for use in blow moulding are prepared using a Ziegler Natta or chromium oxide catalyst. The interpolymers preferably have a MFR$_{21}$/MFR$_2$ of 50-150. If made using a Ziegler Natta catalyst, the interpolymer is preferably multimodal. If made using a chromium oxide catalyst, the interpolymer is preferably unimodal.

Representative examples of injection moulded articles that may be prepared include boxes, crates, thin walled packaging, plastic housing, buckets, toys, racks, rail pads, trash cans, caps and closures. Preferred interpolymers for injection moulding have a density of more than 955 g/dm$^3$, e.g. 955-970 g/dm$^3$. Preferred interpolymers for injection moulding have a MFR$_2$ of 0.5-100 g/10 min.

Particularly preferred interpolymers for use in injection moulding are prepared using a Ziegler Natta catalyst. The interpolymers preferably have a MFR$_{21}$/MFR$_2$ of 20-40. The interpolymers used for injection moulding may be unimodal or multimodal.

Representative examples of rotomoulded articles that may be prepared include water tanks, bins, containers and small boats. Preferred interpolymers for rotomoulding have a density of 915-950 g/dm$^3$. Preferred interpolymers for rotomoulding have a MFR$_2$ of 0.5-5 g/10 min.

Pipe

The interpolymer of the present invention may be advantageously used in pipe applications. Preferably, it is used in HDPE pipes, e.g. according to PE80 or PE100 standards. The pipes may be used e.g. for water and gas distribution, sewer, wastewater, agricultural uses, slurries, chemicals etc.

The interpolymer used in pipe applications may be prepared using a chromium oxide catalyst in, e.g. a single stage polymerization. Alternatively, the interpolymer may be prepared in a multireactor process, preferably a staged polymerization, still more preferably in two or three stages, e.g. using a Ziegler Natta catalyst. Single site catalysts may, however, also be used.

Preferred interpolymers for use in pipe applications have a density of 930-960 g/dm$^3$, preferably 940-954 g/dm$^3$, more preferably 942-952 g/dm$^3$. Preferred interpolymers for use in pipe applications also have a MFR$_5$ of 0.1-0.5 g/10 min, more preferably 0.15-0.4 g/10 min. Preferred interpolymers for use in pipe applications have a MFR$_{21}$/MFR$_5$ of 14-45, more preferably 16-37, most preferably 18-30. Preferred interpolymers for use in pipe applications have a comonomer content of 0.8-5% wt, more preferably 1-3% wt. If used with added carbon black, the density of the interpolymer with the carbon black is preferably 940-970 g/dm$^3$, more preferably 948-966 g/dm$^3$, still more preferably 953-963 g/dm$^3$.

If the interpolymer comprises of more than one component, and especially if it is prepared using a Ziegler Natta catalyst, it preferably comprises:

A. A polymer component(s) which is 25-65% wt, more preferably 35-60% wt of the interpolymer and comprises less than 1% wt of comonomer, more preferably less than 0.5% wt comonomer and has a MFR$_2$ of 50-5000 g/10 min, more preferably 100-1000 g/10 min.

B. A polymer component(s) which is 25-65% wt, more preferably 35-60% wt of the interpolymer and comprises more than 0.5% wt of comonomer, more preferably more than 1% wt of comonomer and has a MFR$_2$ of 50-5000 g/10 min, more preferably 100-1000 g/10 min.

Having generally described this invention, a further understanding can be obtained by reference to certain specific examples which are provided herein for purposes of illustration only, and are not intended to be limiting unless otherwise specified.

EXAMPLES

The present invention will now be described with reference to the following non-limiting examples wherein:

Determination Methods
General Methods
Unless otherwise stated, the following parameters were measured on polymer samples as indicated in the Tables.

$MFR_2$, $MFR_5$ and $MFR_{21}$ were measured according to ISO 1133 at loads of 2.16, 5.0, and 21.6 kg respectively. The measurements were at 190° C. for polyethylene interpolymers and at 230° C. for polypropylene interpolymers.

Molecular weights and molecular weight distribution, Mn, Mw and MWD were measured by Gel Permeation Chromatography (GPC) according to the following method: The weight average molecular weight Mw and the molecular weight distribution (MWD=Mw/Mn wherein Mn is the number average molecular weight and Mw is the weight average molecular weight) is measured by a method based on ISO 16014-4:2003. A Waters 150CV plus instrument, equipped with refractive index detector and online viscosimeter was used with 3×HT6E styragel columns from Waters (styrene-divinylbenzene) and 1,2,4-trichlorobenzene (TCB, stabilized with 250 mg/L 2,6-Di tert butyl-4-methyl-phenol) as solvent at 140° C. and at a constant flow rate of 1 mL/min. 500 µl of sample solution were injected per analysis. The column set was calibrated using universal calibration (according to ISO 16014-2:2003) with 15 narrow molecular weight distribution polystyrene (PS) standards in the range of 1.0 kg/mol to 12 000 kg/mol. These standards were from Polymer Labs and had Mw/Mn from 1.02 to 1.10. Mark Houwink constants were used for polystyrene and polyethylene (K:9.54×10$^{-5}$ dL/g and a: 0.725 for PS and K: 3.92×10$^{-4}$ dL/g and a: 0.725 for PE). All samples were prepared by dissolving 0.5-3.5 mg of polymer in 4 mL (at 140° C.) of stabilized TCB (same as mobile phase) and keeping for 3 hours at 140° C. and for another 1 hour at 160° C. with occasional shaking prior to sampling into the GPC instrument.

Melting temperature was measured according to ISO 11357-1 on Perkin Elmer DSC-7 differential scanning calorimetry. Heating curves were taken from −10° C. to 200° C. at 10° C./min. Hold for 10 min at 200° C. Cooling curves were taken from 200° C. to −10° C. at 10° C. per min. Melting temperature was taken as the peak of endotherm of the second heating.

Comonomer content (wt %) was determined based on Fourier transform infrared spectroscopy (FTIR) determination (using a Perkin Elmer Spectrum GX instrument) calibrated with C13-NMR.

Density of materials is measured according to ISO 1183:1987 (E), method D, with isopropanol-water as gradient liquid on pieces from compression moulded plaques. The cooling rate of the plaques when crystallizing the samples was 15 C/min. Conditioning time was 16 hours.

Xylene solubles were determined according to ISO-6427, annex B1992.

Rheology of the polymers was determined by frequency sweep at 190° C. under nitrogen atmosphere according to ISO 6721-10, using Rheometrics RDA II Dynamic Rheometer with parallel plate geometry, 25 mm diameter plate and 1.2 mm gap. The measurements gave storage modulus (G'), loss modulus (G") and complex modulus (G*) together with the complex viscosity ($\eta$*), all as a function of frequency ($\omega$). These parameters are related as follows: For any frequency $\omega$: The complex modulus: $G^* = (G'^2 + G''^2)^{1/2}$. The complex viscosity: $\eta^* = G^*/\omega$. The denomination used for modulus is Pa (or kPa) and for viscosity Pa s and for frequency (1/s). $\eta^*_{0.05}$ is the complex viscosity at a frequency of 0.05 s$^{-1}$ and $\eta^*_{300}$ is the complex viscosity at 300 s$^{-1}$.

According to the empirical Cox-Merz rule, for a given polymer and temperature, the complex viscosity as function of frequency measured by this dynamic method is the same as the viscosity as a function of shear rate for steady state flow (e.g. a capillary).

The activity coefficient for the bench scale polymerization runs is calculated by the following equation:

$$\text{Activity\_coefficient}(kg/(g, bar, h)) = \frac{(\text{Yield\_of\_polymer\_(kg)})}{(\text{Catalyst\_amount\_(g)}) \cdot (\text{Partial\_pressure\_of\_ethylene\_(bar)}) \cdot (\text{Polymerisation\_time\_(h)})}$$

For continuous polymerizations, the activity coefficient is analogous by using production rate of polymer instead of yield of product and feed rate of catalyst system instead of amount fed catalyst, and using the average residence time in the continuous reactor.

Mechanical Properties on Compression Moulded Specimens
Secant modulus is measured according to ASTM D 882-A at a temperature of 23° C. and a speed of 1 mm/min.
Tensile properties (tensile stress at yield, tensile strain at yield, tensile strength at break, tensile strain at break) on compression moulded samples are measured at 23° C. according to ISO 527-2, the modulus is measured at a speed of 1 mm/min, while yield and break point properties at 50 mm/min. The specimens for this test are made according to ISO 1872-2 with cooling rate 15° C./min.
For Charpy impact are used compression moulded specimens made according to ISO 10350-1 (Nov. 15, 1998)—option ISO 179-1 with V-notch type A. These are tested on impact according to ISO 179 at 23° C.
Films
Unless otherwise stated, the following parameters were measured at 23° C. on 40 µm thick films prepared as described in the examples.
Dart drop is measured according to ISO 7765/1.
Haze is measured according to ASTM D 1003.
Gloss is measured according to ASTM D 2457. Measured at light angle of 60°.
Puncture resistance is measured according to ASTM D5748.
Secant modulus: is measured according to ASTM D 882-A, and calculated from the values at 0.05 and 1.05% strain.
Tensile stress, tensile strain and tensile strength is measured according to ISO 527-3.
Tear strength (Elmendorf) is measured according to ISO 6383/2

Examples

Raw Materials
Ethylene: Polymerization grade.
Hydrogen: Grade 6.0.
1-hexene: Sasol. Stripped of volatiles and dried with 13× molecular sieve.
1-butene: Polymerization grade (99.5%). $N_2$ bubbled and dried with 13× molecular sieve.
3-methyl-1-butene: Produced by Evonik Oxeno. Purity>99.7%. $N_2$ bubbled and dried with 13× molecular sieve.
Propane and isobutane: Polymerization use quality.
Nitrogen: <0.7 ppm oxygen, dew point<−98° C.

Example 1

Gas Phase Polymerization Using a Particulate Single Site Catalyst

The catalyst system ((n-Bu-Cp)$_2$HfCl$_2$ and MAO supported on calcined silica) was prepared according to example 1 of WO 98/02246, except Hf was used as transition metal instead of Zr and the calcination (dehydration) temperature of silica was 600° C.

Polymerization Method

Polymerization was carried out in an 8 liter reactor fitted with a stirrer and a temperature control system. The same comonomer feeding system was used for all runs. The procedure consisted of the following steps:
1. Catalyst system was fed into the reactor.
2. Stirring was started (280 rpm).
3. The reactor was heated to the polymerization temperature of 70° C.
4. Propane (400 ml) was added.
5. Ethylene, comonomer and hydrogen were added into the reactor. The pressure was maintained at 21 bar gauge pressure by supply of ethylene via a pressure control valve. Hydrogen had been previously mixed with ethylene in the ethylene supply cylinder. Comonomer was also added continuously into the reactor, proportional to the ethylene flow.
6. The polymerization was stopped by venting the reactor of volatiles and reducing the temperature.
7. The polymer was further dried at 70° C. in the reactor with $N_2$ flow.

Further details of the polymerization procedure and details of the resulting interpolymers are provided in Table 1 and FIG. 1a.

Results

TABLE 1a

Gas phase polymerization with particulate single site catalyst

| | | Run no | | | | | |
|---|---|---|---|---|---|---|---|
| | | 1 | 2 | 3 | 4 | 5 | 6 |
| POLYMERIZATION | | | | | | | |
| Catalyst feed | g | 1.12 | 0.95 | 0.74 | 0.68 | 0.58 | 0.40 |
| Hydrogen in ethylene feed | ppm | 520 | 520 | 520 | 520 | 510 | 510 |
| Comonomer type* | — | M1B | M1B | M1B | M1B | M1B | M1B |
| Comonomer start | ml | 8 | 8 | 25 | 40 | 40 | 60 |
| Feed ratio comonomer/ethylene | g/g | 0.024 | 0.063 | 0.125 | 0.199 | 0.310 | 0.367 |
| Run time | min | 62 | 60 | 68 | 64 | 54 | 60 |
| Yield | g | 1330 | 1250 | 1060 | 1160 | 1150 | 910 |
| Productivity | kg PE/g cat. | 1.19 | 1.32 | 1.43 | 1.71 | 1.98 | 2.28 |
| Activity coefficient | g PE/(g cat., h, bar) | 185 | 212 | 204 | 258 | 355 | 367 |
| POLYMER ANALYSES POWDER | | | | | | | |
| MFR2 | g/10 min | 1.10 | 1.10 | 1.1 | 0.89 | 0.78 | 0.76 |
| MFR21 | g/10 min | n.a. | n.a. | 21.0 | 17.0 | n.a. | n.a. |
| $\eta^*_{0.05}$ | Pa s | 6 556 | 6 728 | 6 519 | 11 789 | 10 617 | 7 960 |
| $\eta^*_{300}$ | Pa s | 1 314 | 1 305 | 1 209 | 1 386 | 1 288 | 1 216 |
| Comon. content (FT-IR) | wt % | 2.8 | 3.8 | 5.2 | 6.1 | 7.4 | 7.8 |
| Density | kg/dm³ | 930.9 | 926.4 | 921.8 | 918.7 | 912.9 | 908.0 |
| | | Run no | | | | | |
| | | 7 | 8 | 9 | 10 | 11 | 12 |
| POLYMERIZATION | | | | | | | |
| Catalyst feed | g | 1.45 | 1.45 | 1.45 | 1.40 | 1.31 | 1.04 |
| Hydrogen in ethylene feed | ppm | 530 | 520 | 520 | 520 | 520 | 520 |
| Comonomer type* | — | 1-hexene | 1-hexene | 1-hexene | 1-hexene | 1-butene | 1-butene |
| Comonomer start | ml | 10 | 40 | 30 | 30 | 6 | 20 |
| Feed ratio comonomer/ethylene | g/g | 0.026 | 0.108 | 0.076 | 0.079 | 0.019 | 0.057 |
| Run time | min | 80 | 74 | 74 | 68 | 70 | 72 |
| Yield | g | 1250 | 1290 | 1400 | 1360 | 1260 | 1250 |
| Productivity | kg PE/g cat. | 0.86 | 0.89 | 0.97 | 0.97 | 0.96 | 1.20 |
| Activity coefficient | g PE/(g cat., h, bar) | 104 | 116 | 126 | 138 | 133 | 162 |
| POLYMER ANALYSES POWDER | | | | | | | |
| MFR2 | g/10 min | 1.4 | 0.97 | 0.91 | 0.83 | 0.97 | 1.29 |
| MFR21 | g/10 min | n.a. | n.a. | n.a. | n.a. | n.a. | n.a. |
| $\eta^*_{0.05}$ | Pa s | 5 021 | 9 253 | 11 117 | n.a. | 8 063 | 5 336 |
| $\eta^*_{300}$ | Pa s | 1 143 | 1 043 | 1 229 | n.a. | 1 378 | 1 206 |
| Comon. content (FT-IR) | wt % | 2.9 | 8.8 | 6.6 | 6 | 1.9 | 4.2 |
| Density | kg/dm³ | 931.7 | 912.8 | 919.6 | 924.6 | 935.7 | 923.1 |

*M1B: 3-methyl-1-butene

The results in Table 1a show that for the production of comparable ethylene interpolymers the use of 3-methyl-1-butene in conjunction with a particulate catalyst system comprising a metallocene catalyst in a gas phase polymerization enables a much high catalytic activity to be achieved than when 1-hexene or 1-butene is used as comonomer. This can be seen, for example, by comparing the results obtained in runs 4 and 9 (comparative) of Table 1b.

TABLE 1b

|  | Run 4 | Run 9 |
|---|---|---|
| Comonomer | 3-methyl but-1-ene | 1-hexene |
| Catalyst activity coefficient | 258 | 126 |
| MFR2 | 0.89 | 0.91 |
| MFR21 | 17.0 | n.a. |
| $\eta^*_{0.05}$ | 11 789 | 11 117 |
| $\eta^*_{300}$ | 1 386 | 1 229 |
| Comonomer content (FT-IR) | 6.1 | 6.6 |
| Density | 918.7 | 919.6 |

Some of the results from Table 1a are also presented in FIG. 1.

FIG. 1, a plot of catalyst system activity coefficient versus polyethylene density, shows that in order to produce a polyethylene of a given density, the polymerization utilizing 3-methyl-1-butene as comonomer is significantly more efficient compared to using 1-hexene or 1-butene. This is particularly the case for polyethylene having a density of less than about 920 kg/m$^3$. Furthermore, the activity coefficients obtained here are relatively close to those that by experience has been achieved in slurry polymerizations with the same catalyst to give the same polymer density.

Example 2

Gas Phase Polymerization Using a Ziegler Natta Catalyst

A conventional Ziegler Natta catalyst, with Ti as transition metal, was used.

TEAL (triethyl aluminium): 1 M in heptane

Polymerization Method

Polymerization was carried out in a 5.3 liter reactor fitted with a stirrer and a temperature control system. The same comonomer feeding system was used for all runs. The procedure consisted of the following steps:

1. 260 ml propane was added to the reactor and stirring started (300 rpm). The reactor temperature was 85° C., which temperature was maintained during the polymerization.

2. Hydrogen, ethylene and comonomer were added into the reactor. Hydrogen was added as a batch. The pressure was maintained at the required pressure by supply of ethylene via a pressure control valve. Comonomer was also added continuously into the reactor, proportional to the ethylene flow.

3. Catalyst system was added. The cocatalyst triethylaluminum (TEAL) was fed as 1M in heptane solution.

4. The polymerization was stopped by venting the reactor of volatiles and reducing the temperature.

5. The polymer was further dried in a vacuum oven at 70° C. for 30 minutes.

Figure 2:
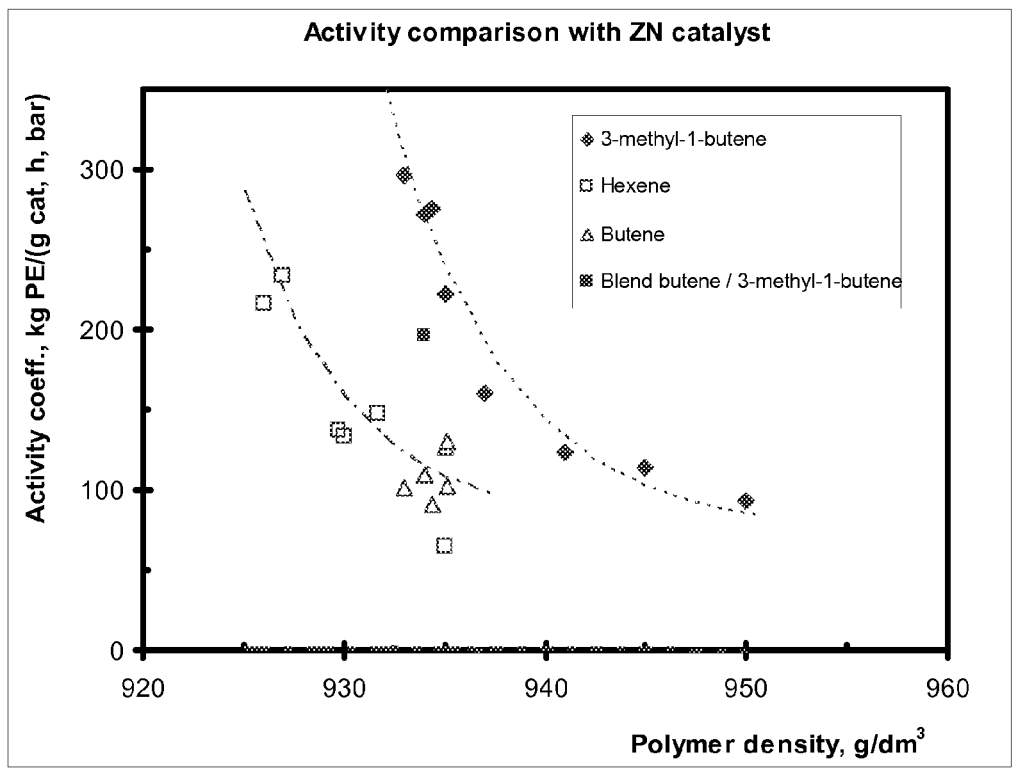
FIG. 2 is a plot of catalyst system activity coefficient versus polyethylene density for a polymerization carried out with a Ziegler Natta catalyst.

Further details of the polymerization procedure and details of the resulting interpolymers are provided in Tables 2a and 2b as well as in FIG. 2.

Polymers were also mixed with antioxidant, 1500 ppm Irganox B561 from Ciba (contains 20 w % Irgafos 168 (Tris (2,4-di-t-butylphenyl) phosphate) and 80 wt % Irganox 1010 (Pentaerythrityl-tetrakis(3-(3',5'-di-tert butyl-4-hydroxyphenyl)-propionate)) and then pelletized by a Prism 16 extruder at 200° C. extruder temperature.

Results

TABLE 2a

Gas phase polymerization with Ziegler Natta catalyst

| | | Run no | | | | | | | | |
|---|---|---|---|---|---|---|---|---|---|---|
| | | 1 | 2 | 3 | 4 | 5 | 6 | 7 | 8 | 9 |
| POLYMERIZATION | | | | | | | | | | |
| Catalyst feed | g | 0.254 | 0.254 | 0.262 | 0.258 | 0.234 | 0.246 | 0.272 | 0.245 | 0.253 |
| TEAL (1M) solution | ml | 3.2 | 3.2 | 3.2 | 3.2 | 3.2 | 3.2 | 3.2 | 3.2 | 3.2 |
| Total pressure | bar g | 21 | 23 | 22 | 22 | 22 | 22 | 22 | 22 | 22 |
| Hydrogen partial pressure start | bar g | 0.5 | 0.5 | 0.5 | 0.5 | 0.5 | 0.5 | 0.3 | 0.5 | 0.7 |
| Comonomer type* | | M1B | M1B | M1B | M1B | M1B | M1B | M1B | M1B | Butene/M1B# |
| Comonomer start | ml | 10 | 10 | 10 | 10 | 10 | 10 | 5 | 30 | |
| Comonomer (continuous) | g/100 g ethylene | 5 | 10 | 15 | 20 | 5 | 40 | 2.5 | 20 | |
| Run time | min | 180 | 180 | 180 | 180 | 180 | 180 | 180 | 180 | 180 |
| Yield | g | 515 | 920 | 1 410 | 1 490 | 520 | 1 065 | 510 | 1 300 | 940 |
| Productivity | kg PE/(g solid cat.) | 2.0 | 3.6 | 5.4 | 5.8 | 2.2 | 4.3 | 1.9 | 5.3 | 3.7 |
| Activity coefficient | g PE/(g cat solid, h, bar) | 123 | 161 | 276 | 296 | 114 | 222 | 93 | 272 | 197 |
| POLYMER ANALYSES OF POWDER | | | | | | | | | | |
| MFR2 | g/10 min | 0.96 | 1.9 | 0.64 | 0.48 | 1.1 | 0.52 | 0.16 | 0.69 | 0.84 |
| MFR21 | g/10 min | 22 | 46 | 15 | 12 | 26 | 13 | 3.2 | | |
| Mw | g/mol | 135 000 | 115 000 | 140 000 | | | | | | |
| Mn | g/mol | 32 000 | 26 000 | 33 000 | | | | | | |
| Mw/Mn | — | | 4.2 | 4.4 | 4.2 | | | | | |
| Comon. content (FT-IR) | wt % | | 2.9 | | 3.2 | 1.4 | | 0.4 | | 1.4/2.5 |
| Density | kg/dm3 | 941 | 937 | 934.4 | 933 | 945 | 935 | 950 | 934 | 934 |
| Ash | wt ppm | 490 | 410 | 270 | 260 | 700 | 350 | 790 | 280 | 400 |

TABLE 2a-continued

Gas phase polymerization with Ziegler Natta catalyst

| | | Run no | | | | | | | | |
|---|---|---|---|---|---|---|---|---|---|---|
| | | 1 | 2 | 3 | 4 | 5 | 6 | 7 | 8 | 9 |
| | | POLYMER ANALYSES OF PELLETS | | | | | | | | |
| MFR2, | g/10 min | | | 0.72 | 0.55 | | | | | |
| Density | kg/dm3 | | | 935.5 | 934 | | | | | |

*M1B: 3-methyl-1-butene; # Feed blend of 78 volume % M1B and 22 volume % 1-butene.

TABLE 2b

Gas phase polymerization with Ziegler Natta catalyst (comparative examples)

| | | Run no | | | | | |
|---|---|---|---|---|---|---|---|
| | | 10 | 11 | 12 | 14 | 17 | 15 |
| | | POLYMERIZATION | | | | | |
| Catalyst feed | g | 0.230 | 0.259 | 0.271 | 0.256 | 0.258 | 0.245 |
| TEAL (1M) solution | ml | 3.2 | 3.3 | 3.4 | 3.4 | 3.4 | 3.3 |
| Total pressure | bar g | 21 | 21 | 21 | 21 | 21 | 21 |
| Hydrogen partial pressure start | bar g | 0.5 | 0.5 | 0.6 | 0.5 | 0.5 | 0.47 |
| Comonomer type* | | Hexene | Hexene | Hexene | Hexene | Hexene | Hexene |
| Comonomer start | ml | 10 | 10 | 0 | 5 | 5 | 5 |
| Comonomer (continuous) | g/100 g ethylene | 3 | 3 | 3 | 3/2.5/2/1.5 | 2.0/1.5/1.0/0.5/0.3 | 2.5/3/2.5/2.0/1.5/1.0/0.5 |
| Run time | min | 165 | 180 | 180 | 115 | 180 | 180 |
| Yield | g | 227 | 922 | 600 | 630 | 627 | 555 |
| Productivity | kg PE/(g cat.) | 1.0 | 3.6 | 2.2 | 2.5 | 2.4 | 2.3 |
| Activity coefficient | g PE/(g cat., h, bar) | 65 | 216 | 134 | 233 | 147 | 137 |
| Ash | wt ppm | 1590 | 420 | 680 | 620 | 630 | 680 |
| | | POLYMER ANALYSES OF POWDER | | | | | |
| MFR2 | g/10 min | 1.3 | 0.31 | 1.9 | 0.6 | 0.66 | 0.95 |
| MFR21 | g/10 min | 33 | 6.2 | 46 | 13 | 14 | 22 |
| Mw | g/mol | 135 007 | 194 113 | 122 954 | 163 939 | 162 310 | 146 576 |
| Comon. content (FT-IR) | wt % | 3.5 | 6.5 | 4.5 | 6.0 | 3.8 | 4.9 |
| Density | kg/dm3 | 935 | 926 | 930 | 927 | 931.7 | 929.7 |

| | | Run no | | | | |
|---|---|---|---|---|---|---|
| | | 19 | 20 | 21 | 23 | 24 |
| | | POLYMERIZATION | | | | |
| Catalyst feed | g | 0.241 | 0.253 | 0.253 | 0.250 | 0.242 |
| TEAL (1M) solution | ml | 3.3 | 3.4 | 3.4 | 3.4 | 3.3 |
| Total pressure | bar g | 21 | 21 | 21 | 21 | 21 |
| Hydrogen partial pressure start | bar g | 0.5 | 0.5 | 0.5 | 0.5 | 0.5 |
| Comonomer type* | | Butene | Butene | Butene | Butene | Butene |
| Comonomer start | ml | 5.6 | 5.5 | 8.25 | 8.25 | 8.25 |
| Comonomer (continuous) | g/100 g ethylene | Man. feed | 5/7/5/7/10/7 | 10/10/5/10/10/10 | 10/5/ | 10/5/7/10/15 |
| Run time | min | 150 | 180 | 180 | 180 | 140 |
| Yield | g | 347 | 542 | 382 | 457 | 317 |
| Productivity | kg PE/(g cat.) | 1.4 | 2.1 | 1.5 | 1.8 | 1.3 |
| Activity coefficient | g PE/(g cat., h, bar) | 102 | 127 | 91 | 109 | 101 |
| Ash | wt ppm | 1100 | 730 | 1030 | 860 | 1190 |

TABLE 2b-continued

Gas phase polymerization with Ziegler Natta catalyst (comparative examples)

POLYMER ANALYSES OF POWDER

| | | | | | | |
|---|---|---|---|---|---|---|
| MFR2 | g/10 min | 0.43 | 0.79 | 0.96 | 0.54 | 0.98 |
| MFR21 | g/10 min | 9 | 18 | 22 | 11 | 22 |
| Mw | g/mol | 188 733 | 153 864 | | 171 503 | 144 771 |
| Comon. content (FT-IR) | wt % | 2.8 | 2.8 | 3.1 | 3.0 | 3.7 |
| Density | kg/dm3 | 935.1 | 935 | 934.4 | 934 | 933 |

*M1B: 3-methyl-1-butene

The results in Tables 2a and 2b show that for the production of comparable ethylene interpolymers the use of 3-methyl-1-butene in conjunction with a catalyst system comprising a Ziegler Natta catalyst in a gas phase polymerization enables a much higher catalytic activity to be achieved than when 1-hexene or 1-butene is used as comonomer. This can be seen, for example, by comparing the results obtained in runs 3 and 8 to run 17 (comparative), see Table 2c.

TABLE 2c

| | Run 3 | Run 8 | Run 17 |
|---|---|---|---|
| Comonomer | 3-methyl but-1-ene | 3-methyl but-1-ene | 1-Hexene |
| Catalyst activity coefficient | 828 | 816 | 147 |
| MFR2 | 0.64 | 0.69 | 0.66 |
| MFR21 | 15 | | 14 |
| Mw | 140 000 | | 162 310 |
| Mn | 33 000 | | |
| Mw/Mn | 4.2 | | |
| Comon. Content (FT-IR) | | | 3.8 |
| Density | 934.4 | 934 | 931.7 |

Some of the results of Tables 2a and 2b are also presented in FIG. 2. This shows that run 9 has an activity close to that typical of the use of 3-methyl-1-butene alone, in spite of using a substantial amount of 1-butene blended with the 3-methyl-1-butene.

Example 3

Use of 3-methyl-but-1-Ene as an In Situ Means to Remove Heat

A polymerization was performed as in Example 1 except that no propane was added and different reactor temperatures were used as detailed in the Table 3 below.

TABLE 3

Polymerisation with particulate single site catalyst, without propane

| | | Run no | |
|---|---|---|---|
| | | 1 | 2 |
| POLYMERIZATION | | | |
| Catalyst feed | g | 0.37 | 0.41 |
| Total pressure | bar g | 10.2 | 8.5 |
| Hydrogen in ethylene feed | ppm | 510 | 510 |
| Comonomer type | — | M1B | M1B |
| Comonomer start | ml | 300 | 150 |
| Feed ratio comonomer/ethylene | g/g | 0.044 | 0.042 |
| Temperature | °C. | 70 | 85 |
| Run time | min | 55 | 40 |
| Yield | g | 360 | 450 |

TABLE 3-continued

Polymerisation with particulate single site catalyst, without propane

| | | Run no | |
|---|---|---|---|
| | | 1 | 2 |
| Productivity | kg PE/g cat. | 0.97 | 1.10 |
| Activity | g PE/(g cat., h, bar) | 171 | 284 |
| ANALYSES | | | |
| MFR2 | g/10 min | 0.21 | 0.72 |
| Density | kg/dm$^3$ | 894 | 903.2 |

The temperature control during these polymerizations was satisfactory. The large density decrease was surprising.

Example 4

Use of 3-methyl-but-1-ene in Staged Polymerization

The same raw materials as in example 1 were used when applicable, including the same catalyst.

Polymerization was carried out in an 8 liter reactor fitted with a stirrer and a temperature control system. The same comonomer feeding system was used for all runs. The procedure consisted of the following steps:

1. Catalyst system was fed into the reactor.
2. 3.8 liter isobutane was added to the reactor and stirring started (300 rpm).
3. The reactor was heated to the desired polymerization temperature of 85° C.
4. Ethylene, comonomer and hydrogen were added into the reactor. The pressure was maintained at the required pressure by the supply of ethylene via a pressure control valve. Hydrogen had been previously mixed with ethylene in the ethylene supply cylinder. Comonomer was also added continuously into the reactor, proportional to the ethylene flow.
5. The consumption of monomer was followed. When about 1200 g polymer had been produced, the reactor was vented, stirring reduced to 30 rpm, the polymer dried with $N_2$ at 70° C. and 40 g polymer sample removed.
6. The temperature was adjusted to the desired polymerization temperature. 400 ml propane was added and stirring adjusted to 280 rpm.
7. Ethylene, comonomer and hydrogen were added into the reactor. The pressure was maintained at the desired pressure by supply of ethylene via a pressure control valve.

Hydrogen had been previously mixed with ethylene in the ethylene supply cylinder. Comonomer was also added continuously into the reactor, proportional to the ethylene flow.

8. The polymerization was stopped by venting the reactor of volatiles and reducing the temperature.
9. The polymer was further dried at 70° C. in the reactor with $N_2$ flow. Further details of the polymerization procedure and details of the resulting interpolymers are provided in Table 4.

Results

TABLE 4

3-methyl-1-butene with single site catalyst polymerisation in 2 stages

| | | Run no 1 | Run no 2 |
|---|---|---|---|
| POLYMERIZATION STAGE 1 - SLURRY | | | |
| Catalyst feed | g | 2.91 | 1.93 |
| Total pressure | bar g | 21 | 21 |
| Reactor temperature | ° C. | 85 | 85 |
| Hydrogen in ethylene feed | molppm | 3550 | 3550 |
| Comonomer type | — | 1-hexene | 3-methyl-1-butene |
| Comonomer start | ml | 30 | 50 |
| Feed ratio comonomer/ethylene | g/g | 0.09 | 0.27 |
| Fraction in stage 1 | wt % | 50 | 50 |
| Yield in stage 1 | g | 1190 | 1180 |
| Run time | min | 47 | 31 |
| Activity coefficient | g PE/(g cat, h, bar) | 245 | 368 |
| $MFR_2$ | g/10 min | 170 | 150 |
| Density | g/dm³ | 937 | 941 |
| POLYMERIZATION STAGE 2 - GAS PHASE | | | |
| Total pressure | bar g | 21 | 21 |
| Reactor temperature | ° C. | 70 | 70 |
| Hydrogen in ethylene feed | molppm | 300 | 300 |
| Comonomer type | — | 1-hexene | 3-methyl-1-butene |
| Comonomer start | ml | 30 | 50 |
| Feed ratio comonomer/ethylene | g/g | 0.09 | 0.29 |
| Fraction in stage 2 | wt % | 50 | 50 |
| Yield in stage 2 only | g | 1150 | 1140 |
| Run time | min | 66 | 33 |
| Activity coefficient | g PE/(g cat, h, bar) | 169 | 334 |

TABLE 4-continued 3-methyl-1-butene with single site catalyst polymerisation in 2 stages

| | | Run no 1 | Run no 2 |
|---|---|---|---|
| TOTAL RUN POLYMER | | | |
| Fraction made in stage 2 | wt % | 50 | 50 |
| $MFR_2$ | g/10 min | 2.1 | 1 |
| Density | g/dm³ | 924 | 920 |

The results in Table 4 show that when comparing 3-methyl-1-butene and 1-hexene in a staged process of one slurry and one gas phase polymerization stage to produce relatively equal products, 3-methyl-1-butene is superior on activity in the slurry as well as in the gas phase stage. Thus multistage polymerization can be advantageously carried out using 3-substituted $C_{4-10}$ alkene, including cases where a gas phase polymerization is followed by a slurry polymerization.

Example 5

Cr Polymerisation

Grade EP352 Cr catalyst from Ineos Silicas was used. This is chromium acetate on a support of porous particles of synthetic silica with some titania. This was activated by fluidizing it in a flow of dry air at a temperature of 600° C. for 15 hours before use.

Polymerisation was carried out in a 3.4 litre reactor fitted with a stirrer and a temperature control system. The procedure consisted of the following steps:

1. 90 ml isobutane, a given amount of nitrogen, the start amount of isobutane and some ethylene were fed to the reactor. The amount of nitrogen added was the amount necessary give 16 bar partial pressure in reactor during polymerisation. The stirring speed was set to 475 rpm.
2. Reactor temperature was increased to the polymerisation temperature set point of 95° C. The catalyst was injected when temperature passed 70° C.
3. The pressure was maintained at 36 bar gauge pressure by supply of ethylene via a pressure control valve. Comonomer was also added continuously to the reactor, proportional to the ethylene flow.
4. The polymerisation was stopped by venting the reactor of volatiles and reducing the temperature, and polymer taken out.
5. The polymer powder was further dried in a vacuum oven at 70° C. for 2 hours.

Results

TABLE 5

Polymerisation with Cr catalyst

| | | Run no 1 | 2 | 3 | 5 | 7 | 8 | 9 | 10 |
|---|---|---|---|---|---|---|---|---|---|
| POLYMERISATION | | | | | | | | | |
| Catalyst feed | g | 0.849 | 0.840 | 0.855 | 0.826 | 0.827 | 0.820 | 0.82 | 0.82 |
| Comonomer type[1] | — | M1B | M1B | M1B | M1B | Hexene | Hexene | Hexene | Hexene |
| Comonomer start | ml | 15 | 15 | 15 | 10 | 5 | 5 | 10 | 10 |
| Feed ratio comonomer/ethylene | g/g | 0.033 | 0.083 | 0.011 | 0.011 | 0.030 | 0.016 | 0.059 | 0.103 |
| Run time | min | 46 | 50 | 46 | 30 | 50 | 45 | 53 | 60 |

TABLE 5-continued

Polymerisation with Cr catalyst

| | | Run no | | | | | | | |
|---|---|---|---|---|---|---|---|---|---|
| | | 1 | 2 | 3 | 5 | 7 | 8 | 9 | 10 |
| Yield | g | 413 | 398 | 412 | 409 | 412 | 402 | 292 | 207 |
| Productivity | kg PE/g cat. | 0.49 | 0.47 | 0.48 | 0.50 | 0.50 | 0.49 | 0.36 | 0.25 |
| Activity coefficient | g PE/ (g cat, h, bar) | 42 | 39 | 40 | 62 | 37 | 41 | 25 | 16 |
| POLYMER ANALYSES POWDER | | | | | | | | | |
| Mw | g/mol | n.a. | 140 000 | 170 000 | 150 000 | 175 000 | 190 000 | 150 000 | 140 000 |
| Mn | g/mol | n.a. | 6 800 | 8 800 | 7 400 | 7 400 | 7 500 | 7 100 | 6 300 |
| Mw/Mn | — | n.a. | 21 | 19 | 20 | 23 | 25 | 21 | 22 |
| MFR2 | g/10 min | 0.28 | 0.46 | 0.33 | 0.34 | 0.18 | 0.14 | 0.37 | 0.5 |
| MFR21 | g/10 min | 34 | 60 | 38 | 42 | 22 | 22 | 53 | 69 |
| $\eta_{0.05}$ | Pa s | 55 942 | 36 278 | 47 418 | 48 254 | 85 141 | 107 371 | 47 924 | 36 151 |
| $\eta_{300}$ | Pa s | 605 | 453 | 576 | 548 | 670 | 693 | 475 | 416 |
| Comon. content by FT-IR | wt % | 2.6 | 5.3 | 2.9 | 2 | 4.9 | 3.4 | 8.1 | 11.6 |
| Density | kg/dm³ | 939 | 928.5 | 939.4 | 943 | 942.6 | 947.3 | 934.3 | 923.6 |

[1]M1B: 3-methyl-1-butene

The polymerisation data and polymer analyses are shown in Table 5.

Figure 3:
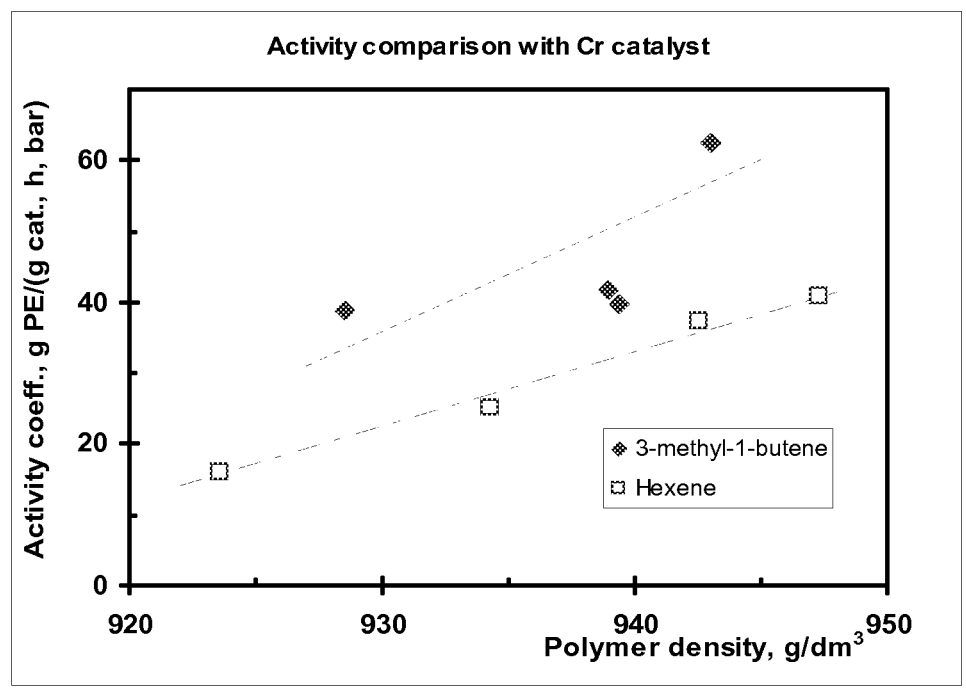
FIG. 3 shows the activity comparison of 3-methyl-1-butene to 1-hexene using a Cr catalyst according to Example 5.

The activity data are plotted in FIG. 3. This shows that the activity to reach a certain density with 3-methyl-1-butene as comonomer was significantly higher than with 1-hexene.

Figure 4:
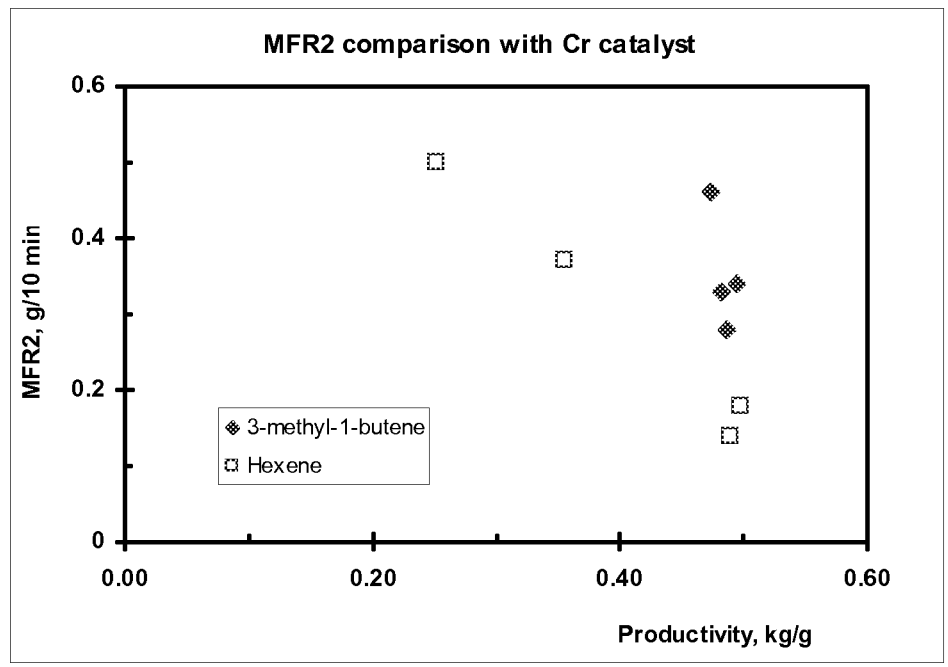
FIG. 4 shows the $MFR^2$ comparison of 3-methyl-1-butene to 1-hexene using a Cr catalyst according to Example 5.
Figure 5:
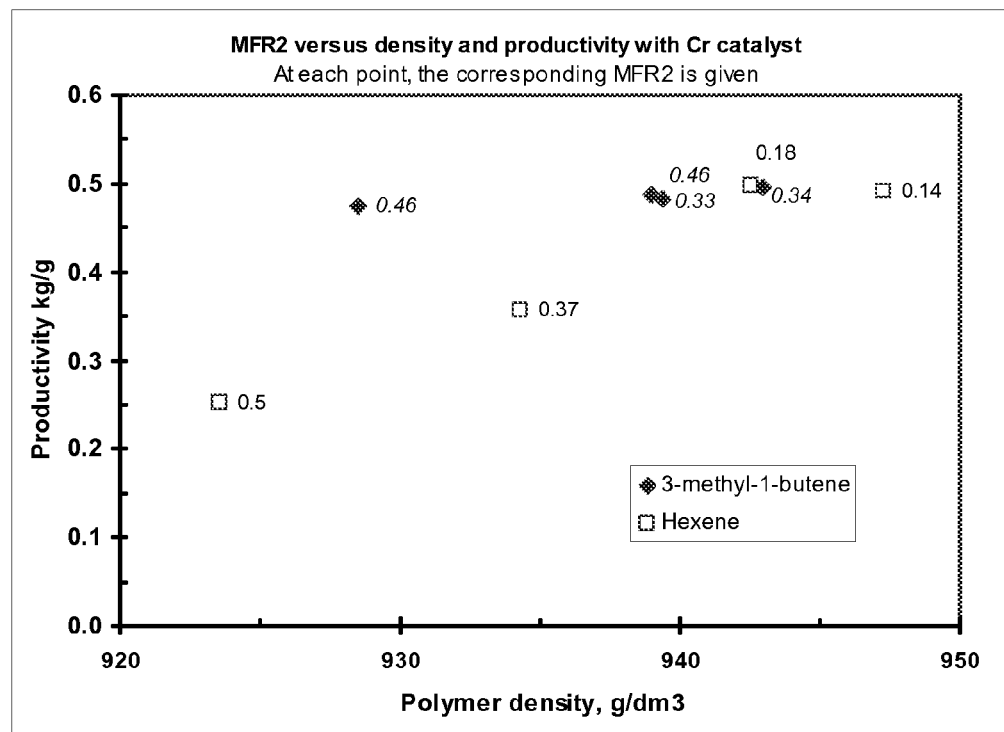
FIG. 5 shows the comparison of the combined effect of productivity and density on $MFR^2$ of 3-methyl-1-butene and 1-hexene using a Cr catalyst according to Example 5.

MFR2 is shown against productivity in FIG. 4. One observes that MFR2 is higher for runs with 3-methyl-1-butene than for runs with 1-hexene. The combined effect of productivity and density on MFR2 is shown in FIG. 5. This figure shows that the observation referred to is not caused by disturbance from variation of the density. At about equal productivity and density, the MFR2 with 3-methyl-1-butene is about double that with 1-hexene (0.34 versus 0.18). Further on, it should be borne in mind that with a given Cr chromium oxide polymerisation system, the lowest MFR2's should be found near the upper right corner of the figure, while the highest would be found near the lower left corner. In spite of higher productivities of runs with 3-methyl-1-butene versus the runs with 1-hexene at similar densities, the MFR2 values for 3-methyl-1-butene still are higher than for 1-hexene. Thus, 3-methyl-1-butene is able to give higher MFR2 polymer at given density and productivity. This surprising property will enable higher MFR2 polymers to be made with 3-methyl-1-butene comonomer than with 1-hexene.

Example 6

Ziegler Natta Co- and Ter-Polymerisation

Ziegler Natta catalyst was synthesised in laboratory scale according to Example 1 of US 2006/0014897.

Polymerisation

Polymerisation was carried out in an 8 litre reactor fitted with a stirrer and a temperature control system. 0.15 bar $H_2$ had been added to the reactor. Polymerisation was done at 85°, at a total pressure of 21 bar gauge, and with 15 bar $N_2$ partial pressure in the reactor. No alkane was added. 1 M triethylaluminum (TEAL) in heptane was added as given in Table 6a and polymerised for a period as shown in Table 6a.

Figure 6:
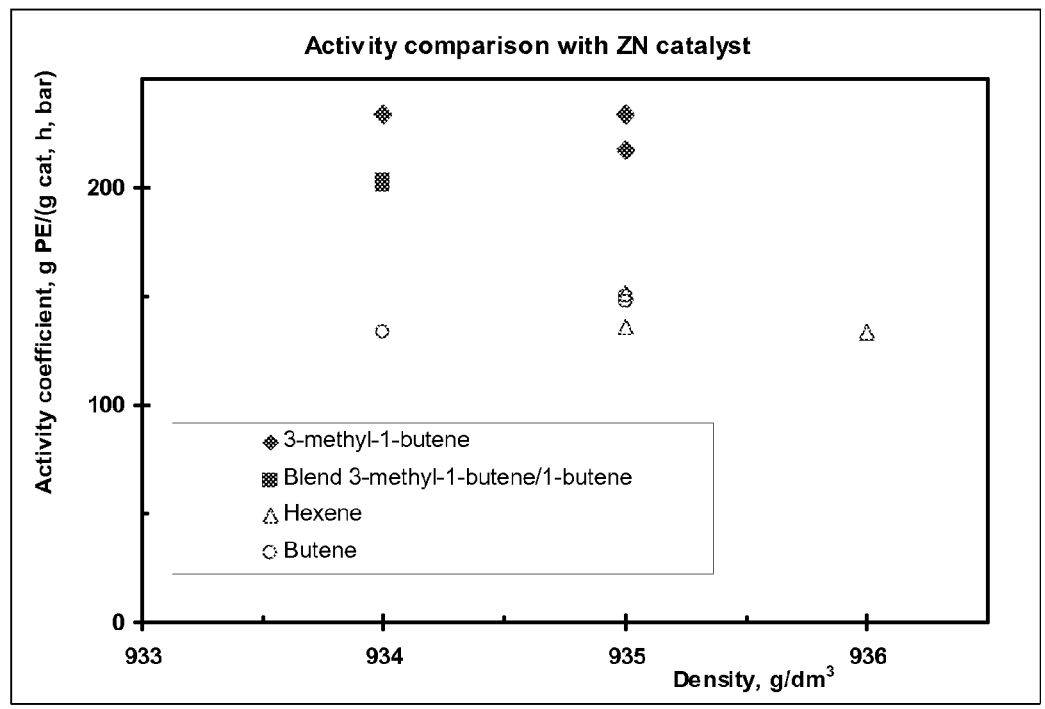
FIG. 6 shows the density results comparison of 3-methyl-1-butene and 1-hexene using a Ziegler Natta catalyst according to Example 6.

Table 6a and FIG. 6 show that the runs gave essentially the same density. The activity coefficient with 3-methyl-1-butene as comonomer is about 1.7 higher than with the linear alkenes 1-butene and 1-hexene in order to reach this density. Using a mixture of 3-methyl-1-butene and 1-butene, surprisingly gives almost no loss in activity coefficient in comparison to using 3-methyl-1-butene alone to reach this density. This was achieved by adding about half the amount of 1-butene used alone, and about half of the 3-methyl-1-butene used alone. Thus, a mixture of 3-methyl-1-butene and a linear 1-alkene gives a combination of essentially the high activity achieved with 3-methyl-1-butene alone, at the same time that it needs a much lower total concentration of comonomer in the reactor than 3-methyl-1-butene alone as comonomer to reach a given density.

Pelletisation

The dried polymer powders from polymerisations were mixed with 1500 ppm Irganox B561 antioxidant from Ciba (contains 20 w % Irgafos 168 (Tris(2,4-di-t-butylphenyl) phosphate) and 80 wt % Irganox 1010 (Pentaerythrityl-tetrakis(3-(3',5'-di-tert butyl-4-hydroxyphenyl)-propionate)) and 10% wt of a Ziegler Natta bimodal PE of density 937 g/dm³ and MFR2 of 0.4. The mixture was blended pelletised by a Prism 16 extruder at 210° C. extruder temperature. It was observed that the maximum output rate achievable before getting operational problems was highest for polymers with 3-methyl-1-butene only as comonomer and next highest for polymers with a blend of 3-methyl-1-butene and 1-butene, see Table 6a. The polymers with only linear alkenes (1-butene and 1-hexene) as comonomer were inferior.

TABLE 6a

Ziegler Natta co-and ter-polymerisation, pelletisation and moulded specimens tests

| | | Run no 1 | Run no 2 | Run no 3 | Run no 4 | Run no 5 |
|---|---|---|---|---|---|---|
| POLYMERISATION | | | | | | |
| Catalyst feed | g | 0.84 | 0.81 | 0.88 | 0.91 | 0.91 |
| TEAL solution | ml | 11.4 | 11.0 | 11.9 | 12.3 | 12.3 |
| Comonomer type[1] | | M1B | M1B | M1B | M1B/Butene | M1B/Butene |
| Comonomer start | ml | 90 | 75 | 80 | 60 | 60 |
| Comonomer (continuous) 0-10 min | g/100 g ethylene | 72 | 64 | 59 | 52 | 52 |
| Comonomer (continuous) 10 min-end | g/100 g ethylene | 1.9 | 1.8 | 1.8 | 1.5 | 1.5 |
| Run time | min | 126 | 122 | 111 | 117 | 119 |
| Yield | g | 2060 | 1790 | 1900 | 1800 | 1820 |
| Productivity | kg PE/g cat. | 2.5 | 2.2 | 2.2 | 2.0 | 2.0 |
| Activity coefficient | g PE/(g cat., h, bar) | 234 | 217 | 233 | 203 | 202 |
| POLYMER ANALYSES POWDER | | | | | | |
| MFR2 | g/10 min | 0.24 | 0.22 | 0.2 | 0.21 | 0.23 |
| Mw | g/mol | 155 000 | 145 000 | n.a. | n.a. | 150 000 |
| Mn | g/mol | 48 000 | 46 000 | n.a. | n.a. | 41 000 |
| Mw/Mn | — | 3.2 | 3.2 | n.a. | n.a. | 3.7 |
| Comonomer content | wt % | 2.4 | 2.2 | n.a. | n.a. | n.a. |
| Density | kg/dm3 | 935 | 935 | 934 | 934 | 934 |
| PELLETISATION | | | | | | |
| Maximum feed screw rotation speed | % | 45 | 42 | 45 | 40 | 40 |
| Maximum rate | kg/h | 2.3 | 2.3 | 2.3 | 2.0 | 2.0 |
| POLYMER ANALYSES PELLETS | | | | | | |
| MFR2 | g/10 min | 0.16 | 0.17 | 0.17 | 0.19 | 0.20 |
| Density | kg/dm3 | 936.2 | 936.4 | 936.6 | 936.9 | 936.9 |
| COMPRESSION MOULDED SPECIMENS TESTS | | | | | | |
| Secant modulus | MPa | 560 | 625 | 610 | 640 | 630 |
| Tensile stress at yield | MPa | 18.5 | 18.4 | 18.5 | 19.3 | 19.1 |
| Tensile strain at yield | % | 12.0 | 12.0 | 11.9 | 12.3 | 12.1 |
| Tensile strength | MPa | 25.7 | 26.7 | 26.8 | 29.0 | 28.8 |
| Tensile strain at break | % | 650 | 680 | 710 | 727 | 750 |
| Charpy impact strenght | kJ/m$^2$ | 89 | 87 | 87 | 77 | 76 |

| | | Run no 6 | Run no 7 | Run no 8 | Run no 9 | Run no 10 | Run no 11 |
|---|---|---|---|---|---|---|---|
| POLYMERISATION | | | | | | | |
| Catalyst feed | g | 0.71 | 0.95 | 0.94 | 0.93 | 0.93 | 0.93 |
| TEAL solution | ml | 12.9 | 12.8 | 12.6 | 12.6 | 12.6 | 12.6 |
| Comonomer type[1] | | Hexene | Hexene | Hexene | Butene | Butene | Butene |
| Comonomer start | ml | 13 | 22 | 25 | 20 | 25 | 24 |
| Comonomer (continuous) 0-10 min | g/100 g ethylene | 32 | 28 | 30 | 26 | 29 | 24 |
| Comonomer (continuous) 10 min-end | g/100 g ethylene | 0.5 | 0.6 | 0.6 | 0.5 | 0.6 | 0.5 |
| Run time | min | 177 | 158 | 160 | 157 | 154 | 155 |
| Yield | g | 1400 | 1700 | 1900 | 1630 | 1760 | 1800 |
| Productivity | kg PE/g cat. | 2.0 | 1.8 | 2.0 | 1.8 | 1.9 | 1.9 |
| Activity coefficient | g PE/(g cat., h, bar) | 134 | 136 | 152 | 134 | 147 | 150 |
| POLYMER ANALYSES POWDER | | | | | | | |
| MFR2 | g/10 min | 0.14 | 0.18 | 0.15 | 0.17 | 0.18 | 0.18 |
| Mw | g/mol | 155 000 | n.a. | n.a. | n.a. | 170 000 | 170 000 |
| Mn | g/mol | 42 000 | n.a. | n.a. | n.a. | 53 000 | 52 000 |
| Mw/Mn | — | 3.7 | n.a. | n.a. | n.a. | 3.2 | 3.2 |
| Comonomer content | wt % | 1.8 | n.a. | n.a. | n.a. | 2.6 | 2.6 |
| Density | kg/dm3 | 936 | 935 | 935 | 934 | 935 | 935 |

TABLE 6a-continued

Ziegler Natta co-and ter-polymerisation, pelletisation and moulded specimens tests

PELLETISATION

| | | | | | | | |
|---|---|---|---|---|---|---|---|
| Maximum feed screw rotation speed | % | 35 | 40 | 38 | 33 | 40 | 40 |
| Maximum rate | kg/h | 1.7 | 1.8 | 1.5 | 1.7 | 2.0 | 2.0 |

POLYMER ANALYSES PELLETS

| | | | | | | | |
|---|---|---|---|---|---|---|---|
| MFR2 | g/10 min | 0.14 | 0.15 | 0.10 | 0.11 | 0.13 | 0.13 |
| Density | kg/dm3 | 939.4 | 939.5 | 938.7 | 938.5 | 937.0 | 937.9 |

COMPRESSION MOULDED SPECIMENS TESTS

| | | | | | | | |
|---|---|---|---|---|---|---|---|
| Secant modulus | MPa | 690 | 700 | 680 | 650 | 600 | 620 |
| Tensile stress at yield | MPa | 20.6 | 20.6 | 20.1 | 19.7 | 19.0 | 19.4 |
| Tensile strain at yield | % | 11.6 | 11.5 | 11.8 | 12.1 | 12.3 | 10.5 |
| Tensile strength | MPa | 27.0 | 28.1 | 25.9 | 28.3 | 29.4 | 33.4 |
| Tensile strain at break | % | 630 | 710 | 590 | 700 | 775 | 885 |
| Charpy impact strenght | kJ/m$^2$ | 72 | 74 | 90 | 80 | 82 | 77 |

[1] Mix M1B/Butene: 75 vol %/25 vol %. M1B: 3-methyl-1-butene

TABLE 6b

Ziegler-Natta polymer film blowing and film properties

| Polymerisation run material | | 1 | 2 | 3 | 4 | 5 | 9 | 10 | 11 |
|---|---|---|---|---|---|---|---|---|---|
| Comonomer type[1] | | M1B | M1B | M1B | M1B/Butene | M1B/Butene | Butene | Butene | Butene |

FILM BLOWING[2]

| | | | | | | | | | |
|---|---|---|---|---|---|---|---|---|---|
| Bubble stability | | Stable | Stable | Stable | Stable | Stable | Pumping | Pumping | Pumping |
| Output kg/h | kg/h | 4.38 | 4.38 | 4.38 | 3.92 | 4.21 | 2.81 | 3.05 | na |
| Take off speed | m/min | 3.3 | 3.3 | 3.3 | 3.1 | 3.1 | 2.6 | 2.6 | na |

FILM TESTING General

| | | | | | | | | | |
|---|---|---|---|---|---|---|---|---|---|
| Density (film material) | kg/dm$^3$ | 935.2 | 935.4 | 935.2 | 935.7 | 935.5 | 936.7 | 936.1 | 937.1 |
| Dart drop | g | 180 | 170 | 160 | 175 | 160 | 125 | 115 | 100 |

Puncture resistance

| | | | | | | | | | |
|---|---|---|---|---|---|---|---|---|---|
| Max force | N | 69 | 76 | 75 | 69 | 74 | 64 | 61 | 51 |
| Deformation at max force | mm | 75 | 84 | 87 | 78 | 80 | 62 | 64 | 58 |

Optical properties

| | | | | | | | | | |
|---|---|---|---|---|---|---|---|---|---|
| Gloss | % | 23 | 25 | 26 | 38 | 41 | 21 | 22 | 29 |
| Haze | % | 43 | 43 | 42 | 34 | 30 | 48 | 48 | 41 |

Tests transverse direction (TD)

| | | | | | | | | | |
|---|---|---|---|---|---|---|---|---|---|
| Secant modulus | MPa | 465 | 490 | 495 | 485 | 445 | 510 | 515 | 525 |
| Tensile stress at yield | MPa | 20.2 | 20.9 | 21.4 | 21.5 | 21 | 21.8 | 21.5 | 22 |
| Tensile strain at yield | % | 9.6 | 9.1 | 9.9 | 9.3 | 10.5 | 8.2 | 7.2 | 7.6 |
| Tensile strength | MPa | 48.5 | 51 | 52.6 | 57.5 | 58.6 | 52 | 48 | 41 |
| Tensile strain at break | % | 720 | 715 | 735 | 755 | 790 | 745 | 725 | 730 |
| Elmendorf tear resistance | N | 6.2 | 6.1 | 6.2 | 4.5 | 4.9 | 4 | 4.7 | 3.9 |

Tests machine direction (MD)

| | | | | | | | | | |
|---|---|---|---|---|---|---|---|---|---|
| Secant modulus | MPa | 420.0 | 445 | 420 | 415 | 410 | 435 | 425 | 425 |
| Tensile stress at yield | MPa | 18.6 | 18.8 | 18.6 | 18.8 | 18.6 | 19.1 | 18.8 | 18.5 |
| Tensile strain at yield | % | 12.0 | 11.2 | 12.3 | 11.5 | 11.7 | 10.5 | 9.8 | na |
| Tensile strength | MPa | 55 | 60 | 61 | 57 | 54 | 58.7 | 58 | 58 |
| Tensile strain at break | % | 610 | 620 | 620 | 660 | 625 | 560 | 590 | 560 |
| Elmendorf tear resistance | N | 1.4 | 1.3 | 1.2 | 1.3 | 1.2 | 0.9 | 1.1 | 0.5 |

[1] M1B: 3-methyl-1-butene. Mix M1B/Butene: 75 vol %/25 vol %
[2] Less wrinkles were seen on films during extrusion of films with 3-methyl-1-butene than on the other films.

Film Blowing and Film

Pellets were blown into film on a Collin monolayer film line with screw diameter 25 mm, length/diameter ratio of 25, die diameter 50 mm and with die gap adjusted to 1.5 mm. The polymers were run at a blow up ratio (BUR) of 3.5 and screw speed of 90 rpm. The temperature zones settings were set to (increasing towards extruder head) 200-230° C. By varying take off speed, the film thickness was adjusted to approximately 40 μm in each run. Films for testing were selected to be 40 μm. The film blowing parameters and analytical results are shown in Table 6b.

Table 6b shows that in spite of the constant screw rotational speed, the output rate, and therefore also the take off speed, varied quite much between runs. The polymers with 3-methyl-1-butene only as comonomer had the highest production rate, those with 1-butene only the lowest rates, while the polymers with blend of 3-methyl-1-butene and 1-butene had intermediate rates.

Furthermore, the polymers with 1-butene only showed unstable bubble (indicating that a slightly higher production rate would result in bubble failure), while the runs with 3-methyl-1-butene gave good stability.

It was found that that the polymers with 3-methyl-1-butene as comonomer compared with polymers with 1-butene only as comonomer gave significantly improved properties (Table 3): Better impact properties (higher dart drop), better puncture resistance (higher maximum force and deformation at maximum force), better optical properties (higher gloss, lower haze), and higher Elmendorf tear resistance in both TD and MD direction. It should be noted that for optical properties, gloss and haze, the terpolymers having both 3-methyl-1-butene and 1-butene together were surprisingly the superior.

U.S. provisional patent application 61/146,915 filed Jan. 23, 2009, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A process for the preparation of an alkene interpolymer, comprising:

copolymerizing at least one 3-substituted $C_{4-10}$ alk-1-ene of formula (I) and at least one $C_{2-8}$ alkene;

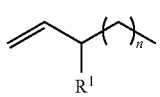
(I)

wherein $R^1$ is a substituted or unsubstituted, $C_{1-6}$ alkyl group and n is an integer between 0 and 6, and wherein the copolymerization is conducted in a gas phase in the presence of a particulate catalyst system, which comprises a chromium oxide catalyst and a content of catalyst system residues in the obtained interpolymer is less than 1200 ppm.

2. The process as claimed in claim 1, wherein the $C_{2-8}$ alkene is ethylene or propylene.

3. The process as claimed in claim 1, wherein $R^1$ is a unsubstituted, $C_{1-6}$ alkyl group and n is an integer between 0 and 6.

4. The process as claimed in claim 1, wherein the 3-substituted $C_{4-10}$ alk-1-ene of formula (I) is 3-methyl-1-butene.

5. The process as claimed in claim 1, wherein the process is continuous.

6. The process as claimed in claim 1, wherein a total productivity of the catalyst system is at least 1000 g polymer per g solid catalyst.

7. The process as claimed in claim 1, wherein the alkene interpolymer comprises 3-substituted $C_{4-10}$ alk-1-ene of formula (I) comonomer in an amount of 0.01-40 wt % based on a total weight of the interpolymer.

8. The process as claimed in claim 1, wherein the alkene interpolymer comprises $C_{2-8}$ alkene monomer in an amount of at least 60 wt % based on the total weight of the interpolymer.

9. The process as claimed in claim 1, wherein the alkene interpolymer comprises two $C_{2-8}$ alkene monomers and at least one 3-substituted $C_{4-10}$ alk-1-ene of formula (I) monomer.

10. The process as claimed in claim 1, wherein a $MFR_{21}$ of the alkene interpolymer is greater than 0.01 g/10 min.

11. The process as claimed in claim 1, wherein a graph of polymer molecular weight distribution of the alkene interpolymer is unimodal.

12. The process as claimed in claim 1, wherein the process is conducted in a condensed or a supercondensed mode.

13. The process as claimed in claim 1, wherein the copolymerization further comprises a $C_{3-8}$ alkane and a concentration of the $C_{3-8}$ alkane is lower than 10 mol %.

14. The process as claimed in claim 1, wherein the 3-substituted $C_{4-10}$ alkene comprises more than 5 wt % of a vaporizable liquid which is continuously fed to the gas phase polymerization.

* * * * *